US010006653B2

(12) United States Patent
Yabuta et al.

(10) Patent No.: US 10,006,653 B2
(45) Date of Patent: Jun. 26, 2018

(54) AIR-CONDITIONING SYSTEM

(71) Applicants: Atsuhiro Yabuta, Tokyo (JP); Shigeo Takata, Tokyo (JP)

(72) Inventors: Atsuhiro Yabuta, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 221 days.

(21) Appl. No.: 14/647,898

(22) PCT Filed: Jan. 25, 2013

(86) PCT No.: PCT/JP2013/051649
§ 371 (c)(1),
(2) Date: May 28, 2015

(87) PCT Pub. No.: WO2014/115317
PCT Pub. Date: Jul. 31, 2014

(65) Prior Publication Data
US 2015/0308702 A1    Oct. 29, 2015

(51) Int. Cl.
*F24F 11/30*    (2018.01)
*F24F 11/00*    (2018.01)
(Continued)

(52) U.S. Cl.
CPC ............ *F24F 11/006* (2013.01); *F24F 11/30* (2018.01); *F24F 11/62* (2018.01); *G05B 15/02* (2013.01);
(Continued)

(58) Field of Classification Search
CPC ............. F24F 11/006; F24F 2011/0052; F24F 2011/0091; G05B 15/02; G05B 2219/2642
See application file for complete search history.

(56) References Cited

U.S. PATENT DOCUMENTS 7,752,856 B2 * 7/2010 Senba .................... F24F 11/006
62/157
2004/0111500 A1 * 6/2004 Rayburn ........... H04L 29/12254
709/222
(Continued)

FOREIGN PATENT DOCUMENTS

EP        1 196 002 A2    4/2002
JP        2004-029904 A    1/2004
(Continued)

OTHER PUBLICATIONS

Machine translation of JP 2008-249233, Tamura Kazuya, Air Conditioning System, Oct. 16, 2008, 9 pages.*
(Continued)

*Primary Examiner* — Thomas C Lee
*Assistant Examiner* — Tri T Nguyen
(74) *Attorney, Agent, or Firm* — Posz Law Group, PLC

(57) ABSTRACT

An air conditioning system includes air conditioning facilities with an indoor unit and an outdoor unit, a dedicated transmission line, a general-purpose equipment controller, and an energy management gateway. The energy management gateway includes a dedicated transmission line that enables communication with the air conditioning facilities via the dedicated transmission line, a management controller that collects management information preregistered for managing the air conditioning facilities from among various information received via the dedicated transmission line, and a processing controller that executes computational processing related to management of the air conditioning facilities on the basis of the collected management information, and controls the air conditioning facilities. The general-purpose equipment controller receives or accepts input of running information corresponding to each of the air conditioning facilities and general-purpose equipment, and con-
(Continued)

trols the general-purpose equipment on the basis of the running information.

20 Claims, 17 Drawing Sheets

(51) Int. Cl.
  *G05B 15/02* (2006.01)
  *F24F 11/62* (2018.01)
  *F24F 11/32* (2018.01)
  *F24F 11/52* (2018.01)

(52) U.S. Cl.
  CPC ............... *F24F 11/32* (2018.01); *F24F 11/52* (2018.01); *G05B 2219/2642* (2013.01)

(56) References Cited

U.S. PATENT DOCUMENTS

| | | | | |
|---|---|---|---|---|
| 2004/0138786 A1* | 7/2004 | Blackett | ................... | G01D 4/00 700/295 |
| 2009/0261174 A1* | 10/2009 | Butler | ................... | F24F 11/006 236/51 |
| 2010/0115364 A1* | 5/2010 | Grohman | .............. | H04L 12/413 714/748 |
| 2012/0179299 A1* | 7/2012 | Gyota | ................... | F24F 11/006 700/276 |
| 2012/0310420 A1* | 12/2012 | Quirk | ................. | G05D 23/1934 700/278 |
| 2014/0188287 A1* | 7/2014 | Sabata | ................. | F24F 11/0012 700/276 |

FOREIGN PATENT DOCUMENTS

| | | |
|---|---|---|
| JP | 2008-249233 A | 10/2008 |
| JP | 2009-008341 A | 1/2009 |
| JP | 2012-021709 A | 2/2012 |
| JP | 2012-229857 A | 11/2012 |
| WO | 2011/099075 A1 | 8/2011 |

OTHER PUBLICATIONS

Machine translation of JP2003-307335, Masui Koki, Air Conditioning System, Oct. 31, 2003, 18 pages.*
Office Action dated Feb. 16, 2016 issued in corresponding JP patent application No. 2014-558396 (and English translation).
Office Action dated Dec. 14, 2016 issued in corresponding CN patent application No. 201380063367.1 (and English translation).
International Search Report of the International Searching Authority dated Apr. 16, 2013 for the corresponding international application No. PCT/JP2013/051649 (and English translation).
Extended European Search Report dated Aug. 30, 2016 issued in corresponding EP patent application No. 13872522.1.

* cited by examiner

AIR-CONDITIONING SYSTEM

CROSS REFERENCE TO RELATED APPLICATION

This application is a U.S. national stage application of International Application No. PCT/JP2013/051649 filed on Jan. 25, 2013, the disclosure of which is incorporated by reference.

TECHNICAL FIELD

The present invention relates to an air-conditioning system.

BACKGROUND ART

In the related art, there exists a remote monitoring system in which multiple air conditioning facilities installed in various buildings (hereinafter designated air conditioning facilities) are connected to a remotely installed information collecting center. This building air conditioning remote management system is a system in which a business that operates the information collecting center provides various services to the owner of a building equipped with air conditioning facilities having a predetermined external communication function, or to users of the air conditioning facilities.

The building air conditioning remote management system is made up of a server computer in the information collecting center, and facility management devices of the multiple air conditioning facilities that periodically transmit predetermined data to the server computer. For such a remote monitoring system, there is proposed a facility monitoring system and a facility information management device in which, if a failure such as a transmission failure that impedes the facilities occurs, for example, a supervisor that monitors the facilities is able to quickly report the failure to the building owner or the users of the air conditioning facilities (see Patent Literature 1).

CITATION LIST

Patent Literature

Patent Literature 1: Japanese Unexamined Patent Application Publication No. 2004-29904 (paragraph [0017] and FIG. 1)

SUMMARY OF INVENTION

Technical Problem

However, in the building air conditioning remote management system of the related art described in Patent Literature 1 and the like, the information collecting center provides services, and for example, an air-conditioning control system inside a building is not managed according to individual requests by the building owner, users of the air conditioning facilities, or the like. Also, there is demand for the building owner, users of the air conditioning facilities, or the like to take advantage of the existing dedicated protocol communication network (transmission line) between air conditioning facilities in an air-conditioning system that the building owner or the like manages himself or herself, and centrally manage various equipment in addition to the air conditioning facilities when conducting air-conditioning control linked to general-purpose equipment such as humidifiers and heaters.

The present invention solves the above problems, and an objective thereof is to provide an air-conditioning system enabling applied usage of dedicated transmission lines making up a network compatible with a communication protocol dedicated to air conditioning facilities, and in addition, enabling air-conditioning control linking air conditioning facilities and general-purpose equipment to be conducted to centrally manage various air conditioning facilities and general-purpose equipment.

Solution to Problem

An air-conditioning system according to the present invention is provided with: air conditioning facilities including one or a plurality of indoor units and one or a plurality of outdoor units; a dedicated transmission line that is a network corresponding to a communication protocol dedicated to the air conditioning facilities; a general-purpose equipment controller to which one or a plurality of general-purpose equipment is connected, the general-purpose equipment controller being connected to the air conditioning facilities via the dedicated transmission line; and an energy management gateway, connected to the air conditioning facilities and the general-purpose equipment controller via the dedicated transmission line, and managing the air conditioning facilities. The energy management gateway includes a dedicated communication unit that enables communication with the air conditioning facilities via the dedicated transmission line, a management controller that collects management information preregistered for managing the air conditioning facilities from among various information received via the dedicated communication unit, and a processing controller that executes computational processing related to management of the air conditioning facilities on the basis of the collected management information, and controls the air conditioning facilities. The general-purpose equipment controller receives or accepts input of running information corresponding to each of the air conditioning facilities and the general-purpose equipment, and controls the general-purpose equipment on the basis of the running information.

Advantageous Effects of Invention

An air-conditioning system of the present invention enables applied usage of dedicated transmission lines making up a network compatible with a communication protocol dedicated to air conditioning facilities, and in addition, enables air-conditioning control linking air conditioning facilities and general-purpose equipment to be conducted to centrally manage various air conditioning facilities and general-purpose equipment.

DESCRIPTION OF EMBODIMENTS

Hereinafter, an air-conditioning system 1 according to Embodiments 1 to 6 of the present invention will be described with reference to the drawings. Also, in the following description, directional terms (such as "right", "left", "in front of", and "behind", for example) are used where appropriate for the sake of comprehension, but such terms are merely explanatory, and do not limit the invention according to this specification. Also, the equipment and particulars described in each of Embodiments 1 to 6 may also be used in combination with each other as appropriate.

Embodiment 1

Figure 1:
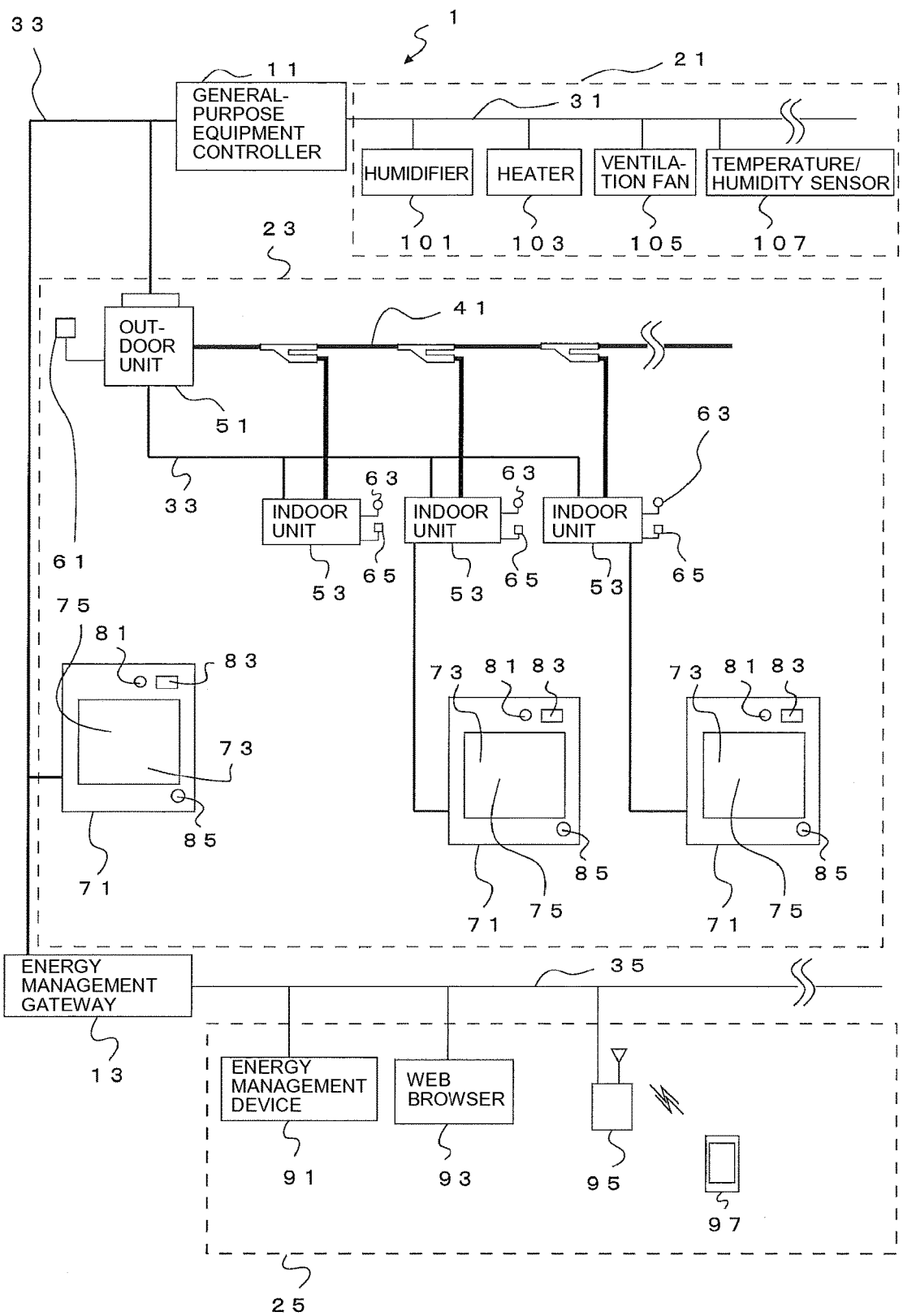
FIG. 1 is a diagram illustrating an overview of a configuration centered on an air-conditioning system 1 according to Embodiment 1 of the present invention.

FIG. 1 is a diagram illustrating an overview of a configuration centered on an air-conditioning system 1 according to Embodiment 1 of the present invention. The configuration herein is merely one example, and the present invention is not limited to this configuration. As illustrated in FIG. 1, the air-conditioning system 1 is made up of an energy management gateway 13, air conditioning facilities 23, a general-purpose equipment controller 11, general-purpose equipment 21, and a dedicated transmission line (dedicated communication network) 33. In the air-conditioning system 1, an outdoor unit 51, an indoor unit 53, and an air conditioning remote control 71 constituting the air conditioning facilities 23, the general-purpose equipment controller 11, and the energy management gateway 13 are communicably connected by the dedicated transmission line 33, and each is able to communicate (transmit and receive) signals including various information (data).

The energy management gateway 13 transmits signals of control commands (control instructions) based on control content or the like to the outdoor unit 51 and the indoor unit 53 of the air conditioning facilities 23, as well as to controlled equipment that controls general-purpose equipment 21 such as a humidifier 101, a heater 103, a ventilation fan 105, a temperature/humidity sensor 107, and the like connected to the general-purpose equipment controller 11. Herein, communication among equipment conducted via the dedicated transmission line 33 is communication related to air conditioning that is conducted according to an independent communication scheme (protocol). This independent communication scheme refers to a communication protocol that is dedicated to communication among air conditioning facilities 23 constructed by each manufacturer independently, and is typically a private communication protocol that is not publicly disclosed. Also, suppose that respective equipment such as the outdoor unit 51, the indoor unit 53, and the general-purpose equipment 21 that are connected by the dedicated transmission line 33 are each distinguished by having a unique number and address or the like for communication (hereinafter designated a management address), for example. Also, suppose that when respective equipment conducts communication, a signal including data of the addresses of the destination and the source of the signal is transmitted.

In addition, the energy management gateway 13 communicates on a general-purpose transmission line (general-purpose communication network) 35 that conducts communication according to a publicly disclosed communication protocol, or in other words an open protocol, and for example, connects and communicates with various external devices 25 such as an energy management device 91 or a web browser 93 via the general-purpose transmission line 35. In addition, the energy management gateway 13 connects to and communicates with a tablet computer 97 that acts as an external device 25 via wireless transmission equipment 95 connected to the general-purpose transmission line 35.

Note that the open protocol referred to herein may be the LonWorks (registered trademark of Echelon Corporation) protocol, or the BACnet (registered trademark of ASHRAE) protocol (a data communication protocol for Building Automation and Control NETworks). An energy management device 91 is a device that centrally manages the energy usage status (electric power usage status) of respective systems installed in a building such as a lighting system or elevator system in addition to an air-conditioning system, for example, or centrally manages the energy usage status of a group of multiple buildings or the like.

In addition, although the general-purpose equipment controller 11 and the general-purpose equipment 21 are connected by an input/output signal line that conducts input/output processing according to input signals and output signals, the energy management gateway 13 and the respective external devices 25 similarly may be connected via an input/output signal line 31 such as a LAN, while the general-purpose equipment controller 11 and the general-purpose equipment 21 may be configured to communicate via the general-purpose transmission line 35.

(Air Conditioning Facilities)

The air conditioning facilities 23 are made up of one or multiple outdoor units 51 and one or multiple indoor units 53 installed in a building or the like, for example, which communicate according to a dedicated communication protocol via the dedicated transmission line 33, and are used for heating and cooling of the building or the like. However, the configuration of the air conditioning facilities 23 is not limited to the above. Ordinarily, the air conditioning facilities 23 are additionally provided with one or multiple air conditioning remote controls 71. Also, the outdoor unit 51 is connected to each indoor unit 53 by refrigerant pipes 41, and air conditioning is conducted by varying the pressure of the refrigerant flowing through the refrigerant pipes 41 to thereby cause the refrigerant to transfer or remove heat.

(Outdoor Unit)

Figure 2:
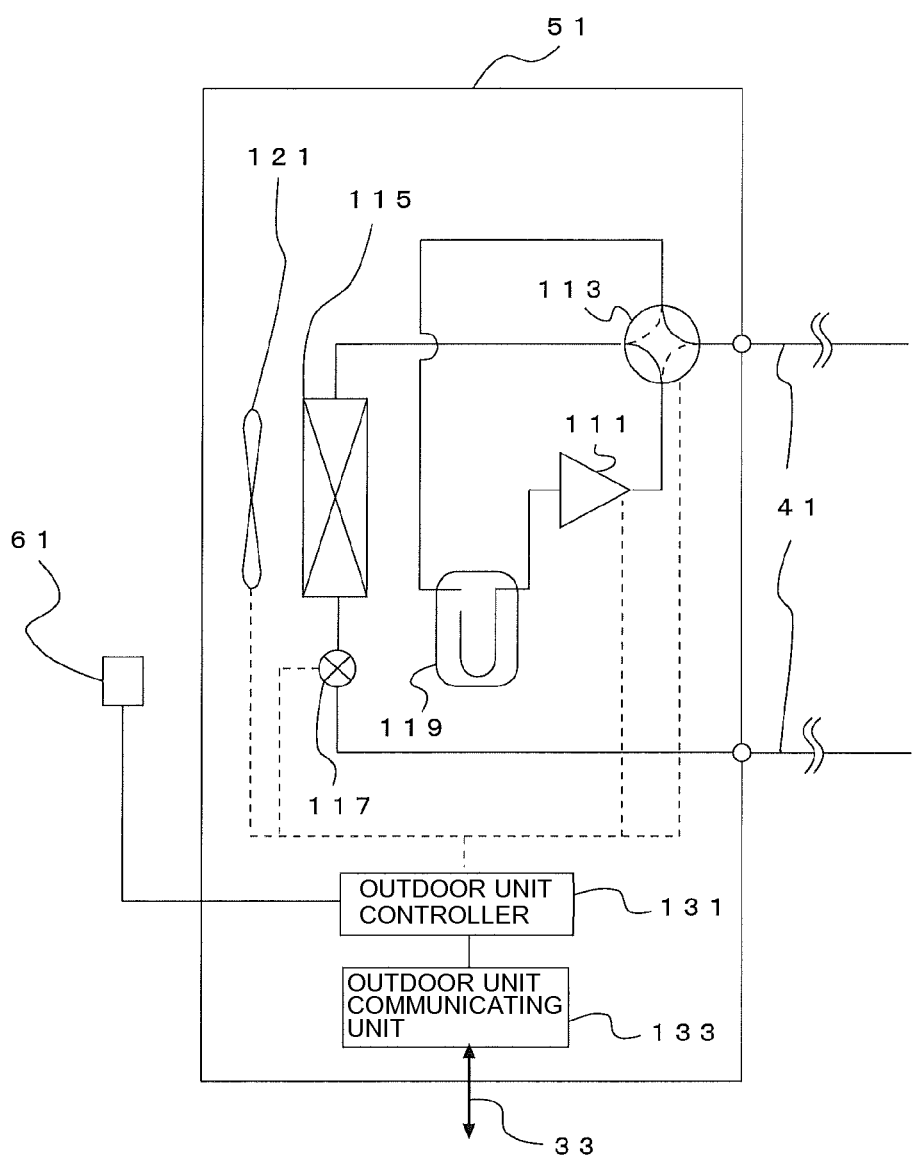
FIG. 2 is a diagram illustrating an exemplary configuration of an outdoor unit 51 according to Embodiment 1 of the present invention.

FIG. 2 is a diagram illustrating an exemplary configuration of an outdoor unit 51 according to Embodiment 1 of the present invention. Outdoor unit controller 131 controls the operation of each means constituting the outdoor unit 51, on the basis of signals or the like that outdoor unit communicating unit 133 receives from the energy management gateway 13 or the like, for example. Herein, the outdoor unit controller 131 includes storing means (not illustrated) that stores data required for processing. The outdoor unit communicating unit 133 is connected to the dedicated transmission line 33, and acts as a signal communication interface between the dedicated transmission line 33 and the outdoor unit controller 131. An outdoor unit temperature sensor 61 is a detecting means that senses the temperature (air temperature) around the outdoor unit 51. Herein, the outdoor unit temperature sensor 61 is described as being part of the configuration of the outdoor unit 51, but may also be provided as a separate unit, for example.

A compressor 111 compresses suctioned refrigerant (gas), adds an arbitrary pressure based on an operating frequency, and delivers (discharges) the result. The compressor 111 may be a variable-capacity inverter compressor equipped with an inverter circuit that varies the volume, or more specifically the amount of delivered refrigerant per unit time, by arbitrarily varying the operating frequency, for example. An outdoor unit side heat exchanger 115 exchanges heat between refrigerant passing through the heat exchanger, and air. An outdoor unit side fan 121 sends air to be heat-exchanged to the outdoor unit side heat exchanger 115, for example. A four-way switching valve 113 is a valve that switches the pipe route depending on cooling operation or heating operation, for example. An accumulator 119 is a device that collects liquid, and causes the compressor 111 to suction only gas refrigerant. Also, an outdoor unit side expansion valve 117 controls the refrigerant flow rate by adjusting the opening degree of a valve on the basis of an instruction from the outdoor unit controller 131.

(Indoor Unit)

Figure 3:
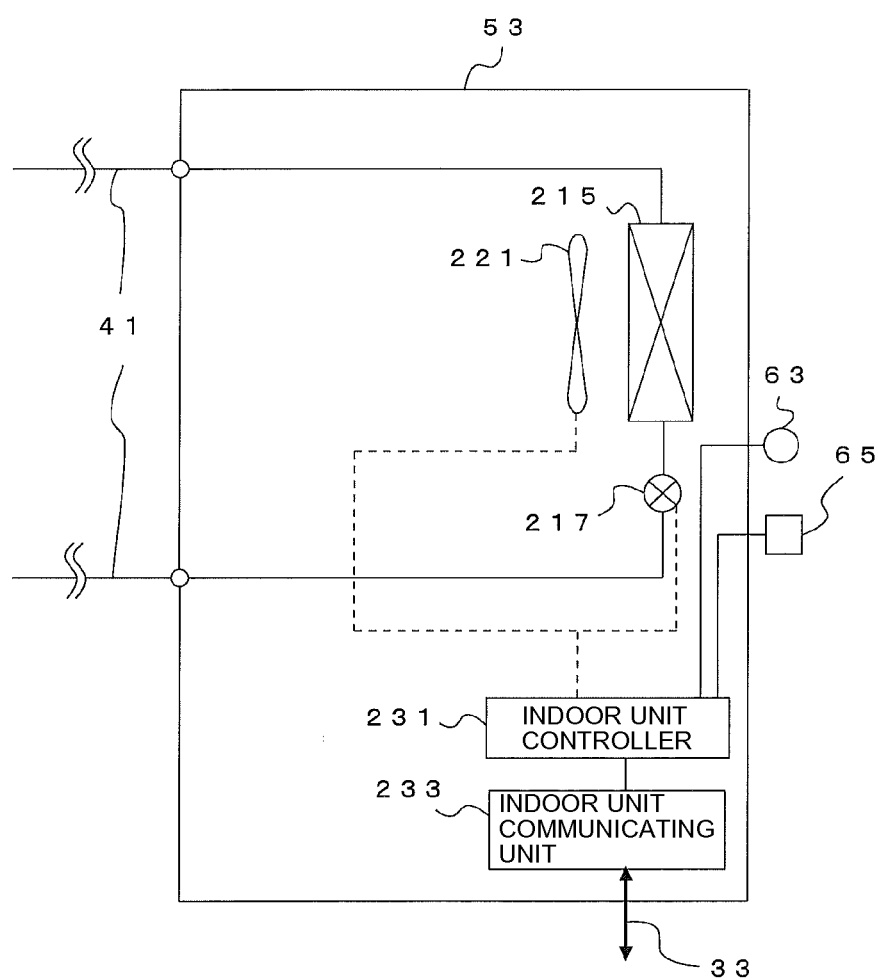
FIG. 3 is a diagram illustrating an exemplary configuration of an indoor unit 53 according to Embodiment 1 of the present invention.

FIG. 3 is a diagram illustrating an exemplary configuration of an indoor unit 53 according to Embodiment 1 of the present invention. Indoor unit controller 231 controls the operation of each means constituting the indoor unit 53 on the basis of signals including operating instructions from the air conditioning remote control 71, signals received by indoor unit communicating unit 233, and the like, for example. Herein, suppose that the indoor unit controller 231 includes storing means (not illustrated) that stores data required for processing. The indoor unit communicating unit 233 is connected to the dedicated transmission line 33, and acts as a signal communication interface between the dedicated transmission line 33 and the indoor unit controller 231. Herein, in Embodiment 1, the indoor unit 53 may send and receive signals directly via the dedicated transmission line 33, but the indoor unit 53 may also be configured to communicate indirectly via the outdoor unit 51, for example.

An indoor unit temperature sensor 65 is a detecting means that senses the temperature (air temperature) of an indoor space in which the indoor unit 53 is provided, for example. In addition, an indoor unit humidity sensor 63 is a detecting means that senses the humidity of the indoor space. Signals corresponding to the sensing of the indoor unit temperature sensor 65 and the indoor unit humidity sensor 63 are transmitted to the indoor unit controller 231. Herein, the indoor unit temperature sensor 65 and the indoor unit humidity sensor 63 are described as being part of the configuration of the indoor unit 53, but may also be provided as separate units, for example. The indoor unit controller 231 generates data corresponding to the temperature and humidity on the basis of the signals. Also, the indoor unit controller 231 transmits a signal including data of the temperature and the humidity to the outdoor unit 51, the energy management gateway 13, and the general-purpose equipment controller 11.

An indoor unit side heat exchanger 215 exchanges heat between refrigerant passing through the heat exchanger, and air. An indoor unit side fan 221 sends air to the indoor unit side heat exchanger 215 for heat exchange, and additionally sends heat-exchanged air into the indoor space. An indoor unit side expansion valve 217 controls the refrigerant flow rate by adjusting the opening degree of a valve on the basis of an instruction from the indoor unit controller 231. As a result, the amount of refrigerant passing through the indoor unit side heat exchanger 215 is controlled, and refrigerant evaporation and the like in the indoor unit side heat exchanger 215 is regulated.

(Energy Management Gateway)

The energy management gateway 13 is communicably connected via the dedicated transmission line 33. The energy management gateway 13 is a device that conducts integrated (centralized) control of equipment to be managed in the air-conditioning system 1 formed by the air conditioning facilities 23 such as the outdoor unit 51, the indoor unit 53, and the air conditioning remote control 71, as well as general-purpose equipment 21 such as the humidifier 101, the heater 103, the ventilation fan 105, and the temperature/humidity sensor 107.

The energy management gateway 13, when controlling the general-purpose equipment 21, sends a control command or the like to the general-purpose equipment controller 11 via the dedicated transmission line 33. In other words, the energy management gateway 13 controls the general-purpose equipment 21 connected to the general-purpose equipment controller 11 via the dedicated transmission line 33 and the general-purpose equipment controller 11.

The energy management gateway 13 collects data on power consumed by some or all of the equipment of the preconfigured air-conditioning system 1, and conducts computational processing such as summarization related to the management of the air conditioning facilities or the general-purpose equipment. In addition, when including a display, the energy management gateway 13 displays the content of the collected power data, power totals, and the like. In addition, the energy management gateway 13 is able to charge fees by adding up the running times of some or all of the equipment in the air-conditioning system 1, for example.

In other words, by using the energy management gateway 13 to control the power management of the air conditioning facilities 23, the general-purpose equipment 21, and the like via the general-purpose equipment controller 11 and the dedicated transmission line 33, it is possible to improve the overall energy efficiency of the air-conditioning system 1.

In addition, for air-conditioning control, the energy management gateway 13 is able to control the air conditioning facilities 23 such as the indoor unit 53 on the basis of a target temperature set for a space subject to air-conditioning (a setting temperature). At this point, if a target temperature range is configured, such as an upper limit temperature and a lower limit temperature, for example, the energy management gateway 13 is able to conduct setback control.

Furthermore, the energy management gateway 13 is able to conduct communication related to the monitoring, management, and the like of the air-conditioning system 1 with an external device 25 via a general-purpose transmission line 35 that communicates according to what is called an open protocol, such as a local area network (LAN), for example. Consequently, the energy management gateway 13 also functions as a communication interface with an external device 25.

For example, by using the energy management device 91 to control the power management of the air conditioning facilities 23, the general-purpose equipment 21, and the like via the energy management gateway 13, it is possible to improve the combined energy efficiency of the building overall, primarily including the air-conditioning system 1 controlled via the dedicated transmission line 33 and other systems (such as an elevator system) inside the building.

Note that data included in a signal transmitted to an external device 25 is management-related data obtained as a result of conducting, by the energy management gateway 13, processing such as computations related to the management of the air conditioning facilities 23 or the general-purpose equipment 21, and is data corresponding to the group configuration of the air conditioning facilities 23, fees, and the like, for example. Also, for the communication, a protocol enabling the transmitting and receiving of versatile Extensible Markup Language (XML) may be used, for example.

Figure 4:
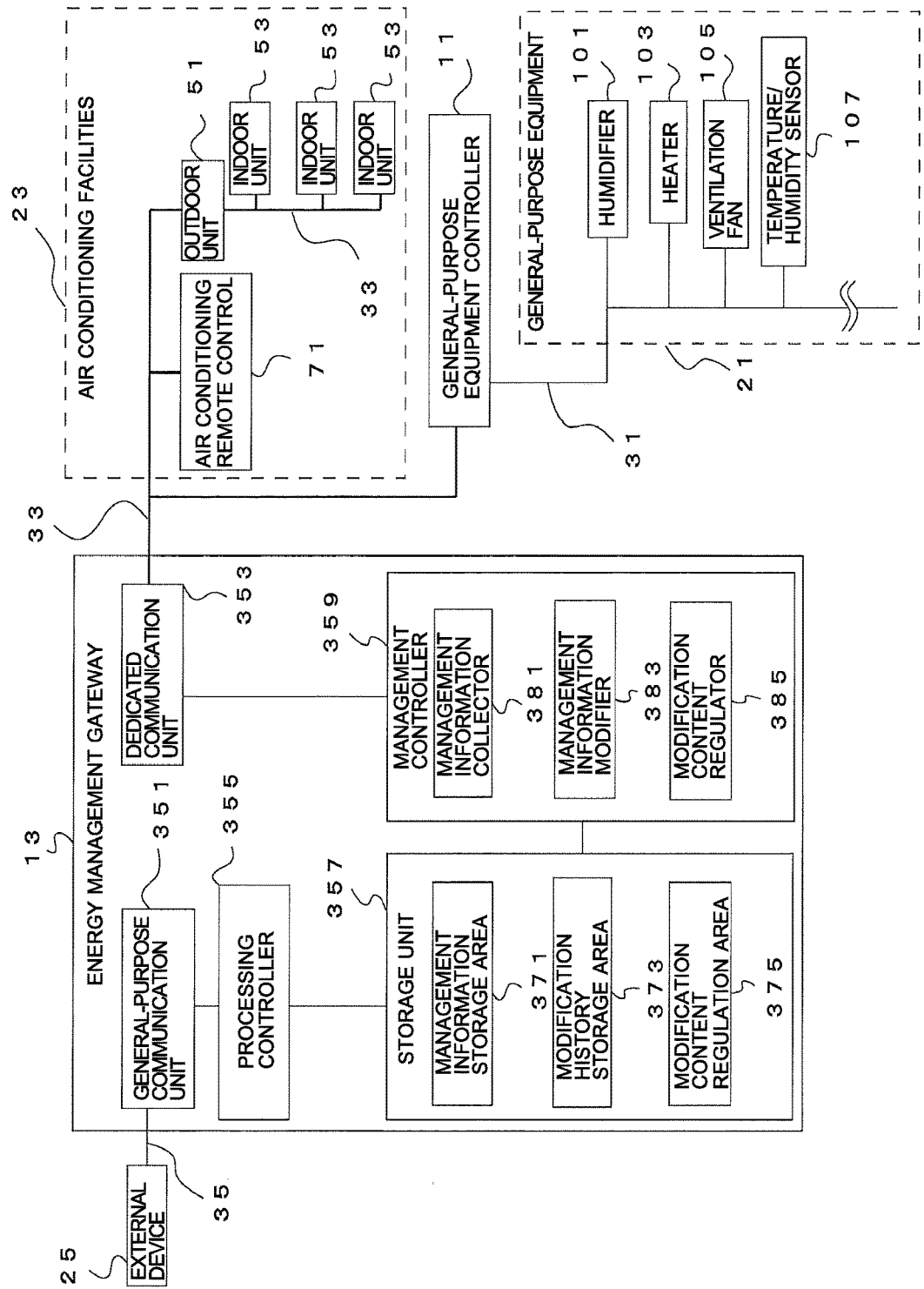
FIG. 4 is a diagram illustrating an example of a detailed configuration of an energy management gateway 13 according to Embodiment 1 of the present invention.

Next, a device configuration related to the communication, processing, and the like of the energy management gateway 13 will be described. FIG. 4 is a diagram illustrating an example of a detailed configuration of an energy management gateway 13 according to Embodiment 1 of the present invention. As illustrated in FIG. 4, the energy management gateway 13 is equipped with a general-purpose communication unit 351, a dedicated communication unit 353, a processing controller 355, a storage unit 357, and a management controller 359.

The dedicated communication unit 353 is connected to a dedicated transmission line 33, and functions as an interface that communicates according to a dedicated protocol with the general-purpose equipment controller 11 of the air conditioning facilities 23. The dedicated communication unit 353 receives a signal flowing via the dedicated transmission line 33 and extracts data therefrom, and sends on the dedicated transmission line 33 a control command sent from the management controller 359 to the air-conditioning system 1.

The processing controller 355 conducts processing that achieves the functions of the energy management gateway 13, or more specifically, conducts processing related to control commands for respective equipment in the air-conditioning system 1, such as the air conditioning facilities 23 and the general-purpose equipment 21. A sequence of processing instructions is included in the processing controller 355 as an application made up of one or multiple program modules. The processing controller 355 achieves the functions of each device by executing a program stated in a program module.

Thus, the processing controller 355 is able to provide a processing controller corresponding to each device by causing a program required by each device to be stored in memory or the like (not illustrated) and executed. Consequently, it is not necessary to realize processing controller for each device by using specialized design or the like, and the design time may be shortened, for example. Also, since respective processing instructions are included in the processing controller 355 as an application, the adding and deleting of functions and the like may be carried out easily.

Note that the processing controller 355 is formed as an updateable program module, for example. Thus, it is possible to implement the energy management gateway 13 via various media. For example, the energy management gateway 13 may be implemented by being uploaded via microSD (registered trademark of the SD Association). Also, the processing controller 355 may be implemented by being uploaded to the energy management gateway 13 via the general-purpose communication unit 351 or the dedicated communication unit 353.

The management controller 359, on the basis of a command output from the processing controller 355, controls the transmission of a signal or the like related to a control command in the air-conditioning system 1 to the air conditioning facilities 23, the general-purpose equipment 21, or the like via the dedicated transmission line 33.

A management information storage area 371 of the storage unit 357 stores management information by which the energy management gateway 13 controls or manages the air conditioning facilities 23 or the general-purpose equipment 21. A management information collector 381 collects (acquires) preregistered management information from among various information (data) such as running and operating information related to the air conditioning facilities 23 and the general-purpose equipment 21 received by the dedicated communication unit 353, or sensor and actuator detection information related to the air conditioning facilities 23 and the general-purpose equipment 21.

Herein, running/operating information may be, for example, a running or stopped status, a running mode, an air flow rate, an air flow direction, a power consumption quantity, and an indoor setting temperature. On the other hand, suppose that the detection information from various sensors is information such as an indoor temperature, an indoor humidity, an outdoor humidity, an indoor unit intake temperature, a refrigerant pressure, and the status of each piece of equipment, and also includes output information.

In other words, management information refers to information configured as management information required for the energy management gateway 13 to control or manage the air conditioning facilities 23 or the general-purpose equipment 21, from among running and operating information related to the air conditioning facilities 23 and the general-purpose equipment 21, or various information (data) of the detection information from various sensors and actuators related to the air conditioning facilities 23 and the general-purpose equipment 21.

In addition, respective equipment such as the outdoor unit 51, the indoor unit 53, and the general-purpose equipment 21 that are connected by the dedicated transmission line 33 are each distinguished by a management address, which is a unique address for communication, as described earlier. Consequently, when respective equipment conducts communication, each piece of equipment transmits a signal including data (information) of the addresses of the destination and the source of the signal.

For this reason, a management address refers to a source or destination address for the transmission of management information. Thus, by specifying a management address, a piece of equipment among the air conditioning facilities 23 and the general-purpose equipment 21 constituting the air-conditioning system 1 is specified. Consequently, in the air-conditioning system 1, management information may be registered for each management address, and stored in a management information storage area of the storage unit 357.

Also, the processing controller 355 is able to read out management information from the management information storage area 371 of the storage unit 357. Also, the processing controller 355, on the basis of management information read out from the management information storage area 371 of the storage unit 357 is able to perform various computational (arithmetic) processing for managing the air-conditioning system 1, such as computing the power consumption and air conditioning performance of the air-conditioning system 1. Also, the air-conditioning system 1 conducts central control related to air conditioning linking the air conditioning facilities 23 and general-purpose equipment on the basis of management information stored in the storage unit 357.

In addition, the management information may also include information obtained by performing data processing on the running information or the detection information of the air-conditioning system 1. By including information obtained by data processing required for energy management in the preregistered management information, various computations (arithmetic calculations) such as the computation of the power consumption and the air conditioning performance of the air-conditioning system 1 by the processing controller 355 may be shared comparatively easily with various computations for other systems in the building, such as the lighting system or the elevator system, and the processing controller 355 may be achieved with a general-purpose system that is not dedicated to the air-conditioning system 1.

Also, it is not necessary for the processing controller 355 to determine whether or not various information received over the dedicated transmission line 33 is management information every time information is received in order to configure the management information to be registered by the management controller 359. Therefore, the information processing load on the processing controller 355 may be decreased.

The management controller 359 includes a management information modifier 383 that modifies the preregistered management information. For example, the management controller 359 conducts a modification process on the preregistered management information, on the basis of a modification request from the processing controller 355.

Also, the management controller 359 additionally includes a modification content regulator 385 that regulates modification of the management information. Of the various information received over the dedicated transmission line 33, information that cannot be modified (configured) to management information is stored in advance in a modification content regulation area 375 of the storage unit 357 as information whose modification is regulated. For example, if the management controller 359 is allowed to modify temperature data acquired by the indoor unit 53 but not allowed to modify the running frequency of the compressor 111, the modification content regulation area 375 is configured so that the modifiable data (information) and the non-modifiable data (information) are distinguishable.

The management information modifier 383 of the management controller 359 determines whether or not information requested to be modified to management information is being stored in the modification content regulation area 375 of the storage unit 357. Specifically, the management information modifier 383 of the management controller 359 determines whether or not the information requested to be modified to management information is information whose modification is regulated. Note that information whose modification is regulated is assumed to be stored in advance in the modification content regulation area 375 of the storage unit 357.

In the case of management information whose modification is not regulated, the management controller 359 modifies the content of the management information being stored in the management information storage area 371 of the storage unit 357, and adds the information requested to be modified as management information. Also, after modifying the content of the management information stored in the management information storage area 371, the management information modifier 383 also stores a modification history of the management information in a modification history storage area 373 of the storage unit 357. For this reason, by checking the history of modified management information in the storage unit 357, it becomes possible to identify management information that becomes necessary depending on the situation.

Consequently, the management information modifier 383 manages modified management information, stores, in the modification history storage area 373, the old values of the management information being old due to the modification, and stores, in the management information storage area 371, the new values of the management information being new due to the modification. The modification content regulator 385 of the management controller 359, by referencing the modification content regulation area 375, manages the management information that is editable with the processing controller 355 implemented by the user.

The new values of the management information and application input/output information are stored in the management information storage area 371 of the storage unit 357. The new values of the management information are the most recent management information held by the energy management gateway 13. The application input/output information is information made up of application input information and application output information. The application input information is input parameters used to execute computations when the processing controller 355 executes various computations. The input parameters are supplied from the general-purpose communication unit 351 or the dedicated communication unit 353. The application output information is output parameters that are output when the processing controller 355 executes various computations. The output parameters are various information or control parameters for the outdoor unit 51 or the indoor unit 53, for example, and are supplied to the outdoor unit 51 or the indoor unit 53 via the dedicated communication unit 353.

The general-purpose communication unit 351 is connected to the general-purpose transmission line 35, and functions as a communication interface with an external device 25 via the general-purpose transmission line 35 or the wireless transmission equipment 95. The general-purpose communication unit 351 receives a signal flowing via the general-purpose transmission line 35, and extracts data. Also, on the basis of a transmission command from the processing controller 355, management information of the air-conditioning system 1 collected by the management information collector 381 of the management controller 359, or a processing result from computations or the like related to the management of the air conditioning facilities 23 or the general-purpose equipment 21, is sent over the general-purpose transmission line 35.

Note that the general-purpose communication unit 351 may also be configured with a router or the like that includes a routing control function, for example. In addition, the general-purpose communication unit 351 may also be able to convert information to data conforming to a predetermined communication protocol, or more specifically, to data conforming to IEEE 802.11. As another example, information may be converted to data conforming to IEEE 802.15, such as Bluetooth (registered trademark), for example.

The energy management gateway 13 includes a dedicated communication unit 353 and a general-purpose communication unit 351. Thus, the energy management gateway 13 is able to perform protocol conversion by the dedicated communication unit 353 and the general-purpose communication unit 351 on a communication signal corresponding to the dedicated protocol and communicated via the dedicated transmission line 33, and transmit management information related to the air-conditioning system 1 to the energy management device 91 of the external devices 25 via the general-purpose transmission line 35.

Since protocol conversion is conducted by the dedicated communication unit 353 and the general-purpose communication unit 351 of the energy management gateway 13, for information exchange (reception and transmission) from the air-conditioning system 1, it is not necessary to conduct the protocol conversion individually, and thus there is no load imposed on the existing communication that controls the respective equipment of the air-conditioning system 1 in air-conditioning control. Thus, protocol conversion to an open protocol is realizable without affecting communication traffic on the dedicated transmission line 33 of the air-conditioning system 1.

In addition, it is possible for the processing controller 355 to output only preregistered management information from among the various information such as running information or detection information of the air-conditioning system 1 that the dedicated communication unit 353 receives via the dedicated transmission line 33. Thus, it is possible to prevent unwanted release of information, and also reduce the processing load on the processing controller 355.

In addition, some or all of the functions and configuration of the storage unit 357 and the management controller 359 of the energy management gateway 13 may also be realized by a memory card inserted into the energy management gateway 13. The implementation format of the memory card is not particularly limited, and a static random access memory (SRAM), CompactFlash (registered trademark), or an AT Attachment (ATA) card may be implemented, for example. By using a memory card for some or all of the storage unit 357 and the management controller 359 of the energy management gateway 13, when updating the content of the storage unit 357 and the management controller 359, the content may be updated easily by replacing the memory card.

(General-Purpose Equipment Controller)

The general-purpose equipment controller 11 is a device that controls the general-purpose equipment 21 made up of one or multiple pieces of general-purpose facilities equipment, and is connected between the dedicated transmission line 33 and the general-purpose equipment 21 made up of one or multiple pieces of general-purpose facilities equipment.

By connecting the general-purpose equipment controller 11 between the dedicated transmission line 33 and the one or multiple pieces of general-purpose equipment 21 which cannot be directly connected to the dedicated transmission line 33, control of the one or multiple pieces of general-purpose equipment 21 is realized.

If the format of the communication signal or data corresponding to the dedicated protocol between the energy management gateway 13 and the air conditioning facilities 23 differs from the format for the general-purpose equipment 21, the general-purpose equipment controller 11 performs format conversion to an operating signal for controlling the general-purpose equipment 21 and output the converted signal or the converted data to the general-purpose equipment 21.

The general-purpose equipment controller 11 performs format conversion to convert a control signal or detection signal from the general-purpose equipment 21 into a communication signal or data corresponding to the communication protocol dedicated to the air conditioning facilities 23, and transmits the converted communication signal or data to the energy management gateway 13 or the air conditioning facilities 23 via the dedicated transmission line 33.

The general-purpose equipment controller 11 controls general-purpose equipment 21 equipped with an actuator or the like, on the basis of a control command for the general-purpose equipment 21 sent from the energy management gateway 13 via the dedicated transmission line 33, for example. In addition, the general-purpose equipment controller 11 performs format conversion and the like on a detection signal from the general-purpose equipment 21 such as the temperature/humidity sensor 107, and transmits detection information to the dedicated transmission line 33 side.

Note that the general-purpose equipment 21 is equipment that provides air conditioning linked to the air-conditioning system 1. For example, the general-purpose equipment 21 is equipment equipped with an actuator such as a ventilation fan 105 that replaces air in the space subject to air-conditioning, a humidifier 101 that humidifies (conducts humidity control of) the space subject to air-conditioning, or a heater 103 that heats the space subject to air-conditioning, various sensors such as a temperature/humidity sensor 107 that detects physical properties such as temperature, and the like. In addition, the general-purpose equipment 21 may not only be other equipment related to air conditioning, but may also be other facilities equipment and systems that carry out operations linked to the air-conditioning system 1, such as a lighting device or lighting system, or an emergency device or emergency system.

In other words, by providing a general-purpose equipment controller 11 that enables linked control of the air conditioning facilities 23 and the general-purpose equipment 21, the scope of air-conditioning control may be broadened. In addition, when constructing individual air-conditioning systems 1 in correspondence with different spaces to be air-conditioned, such as buildings, general-purpose equipment 21 may be included in addition to air conditioning facilities 23 as the equipment to be controlled in the air-conditioning system 1. Thus, the equipment to be independently developed or the like due to the activity of the general-purpose equipment 21 may be reduced, and the overall development costs of the air-conditioning system 1 may be decreased.

Figure 5:
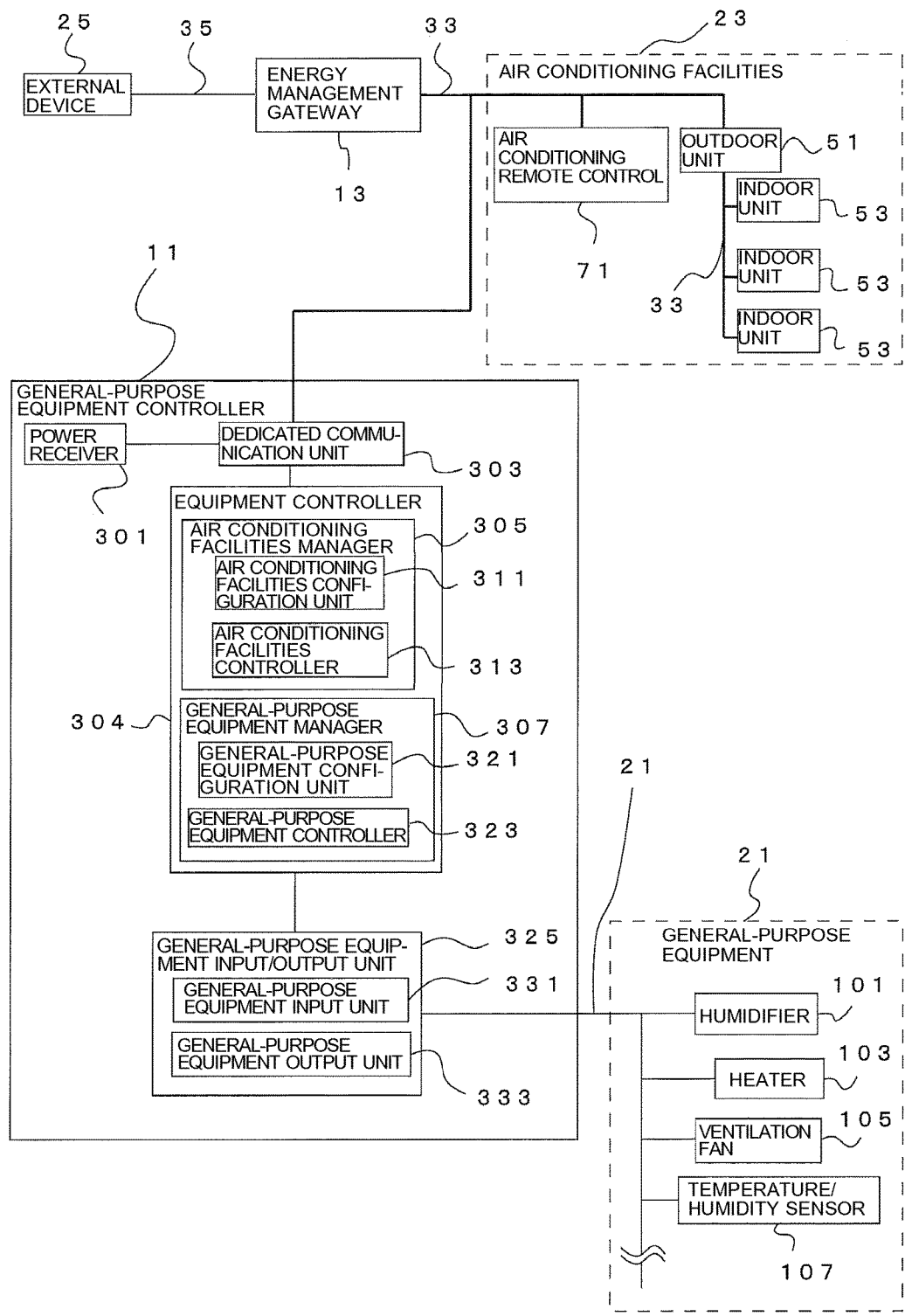
FIG. 5 is a diagram illustrating an example of a detailed configuration of a general-purpose equipment controller 11 according to Embodiment 1 of the present invention.

Next, a device configuration related to the communication, processing, and the like of the general-purpose equipment controller 11 will be described. FIG. 5 is a diagram illustrating an example of a detailed configuration of a general-purpose equipment controller 11 according to Embodiment 1 of the present invention. As illustrated in FIG. 5, the general-purpose equipment controller 11 is equipped with a power receiver 301, a dedicated communication unit 303, and an equipment controller 304. The equipment controller 304 is equipped with an air conditioning facilities manager 305 and a general-purpose equipment manager 307.

In the equipment controller 304, a linkage control algorithm may be preconfigured for the entire air-conditioning system 1 formed by the air conditioning facilities 23 and general-purpose equipment 21 connected to the general-purpose equipment controller 11. This linkage control algorithm is configured on the basis of equipment details or control-related information about the indoor unit 53 and the outdoor unit 51 of the air conditioning facilities 23 as well as the general-purpose equipment 21 connected to the general-purpose equipment controller 11. Thus, a linkage control algorithm is configured for each piece of equipment constituting the air-conditioning system 1 according to the needs of the user (operator).

The general-purpose equipment controller 11 is connected to the general-purpose equipment 21 via the input/output signal line 31. Thus, as described earlier, the general-purpose equipment controller 11 outputs control commands and the like to the general-purpose equipment 21, and controls general-purpose equipment 21 such as the humidifier 101, the heater 103, and the ventilation fan 105, for example.

The general-purpose equipment controller 11 is connected to the energy management gateway 13 and the air conditioning facilities 23 via the dedicated transmission line 33. Thus, the general-purpose equipment controller 11 acquires various information about the air conditioning facilities 23 such as the air conditioning remote control 71, the outdoor unit 51, and the indoor unit 53, for example, and performs linked control of the outdoor unit 51, the indoor unit 53, and the general-purpose equipment 21.

A general-purpose equipment control section 323 of the general-purpose equipment controller 11 receives a control command from the energy management gateway 13 via the dedicated communication unit 303, and outputs the received control command from a general-purpose equipment input/output unit 325 to the general-purpose equipment 21. In addition, when detection signals from various sensors of the general-purpose equipment 21 are input into the general-purpose equipment input/output unit 325, the general-purpose equipment control section 323 of the general-purpose equipment controller 11 transmits the detection signals from the dedicated communication unit 303 to the energy management gateway 13 and the like via the dedicated transmission line 33. Note that the general-purpose equipment input/output unit 325 that conducts input and output with respect to the general-purpose equipment 21 may also be configured as a general-purpose communication unit that communicates with the general-purpose equipment 21.

The dedicated communication unit 303 receives a signal flowing via the dedicated transmission line 33 and extracts data therefrom, and in addition, sends data (information) sent from the air conditioning facilities manager 305 or the general-purpose equipment manager 307 to the dedicated transmission line 33.

The air conditioning facilities manager 305 registers (stores) information required to control or manage the air conditioning facilities 23 as management information. The air conditioning facilities manager 305 collects and stores information that is preregistered as management information from among running and operating information about the air conditioning facilities 23 received by the dedicated communication unit 303, or detection information (data) from various sensors and actuators of the air conditioning facilities 23. The air conditioning facilities manager 305 includes timekeeping means such as a timer for conducting the collection process.

Also, the running and operating information may be, for example, a running or stopped status, a running mode, an air flow rate, an air flow direction, a power consumption quantity, and an indoor setting temperature. On the other hand, the detection information from various sensors is information such as an indoor temperature, an indoor humidity, an outdoor humidity, an indoor unit intake temperature, a refrigerant pressure, and the status of each piece of equipment, and includes output information.

The air conditioning facilities manager 305 is equipped with an air conditioning facilities configuration unit 311 and an air conditioning facilities controller 313. The air conditioning facilities configuration unit 311 manages various configuration information, including management information, and the like. The air conditioning facilities controller 313 transmits a control command to the air conditioning facilities 23 via the dedicated transmission line 33, and controls the air conditioning facilities 23. In addition, the respective equipment of the air conditioning facilities 23 such as the outdoor unit 51 and the indoor unit 53 that are connected by the dedicated transmission line 33 are each distinguished by a management address, which is a unique address for communication, as described earlier. Consequently, when respective equipment conducts communication, each piece of equipment transmits a signal including data (information) of the addresses of the destination and the source of the signal.

The air conditioning facilities configuration unit 311 configures management addresses required for communication with the air conditioning facilities 23 connected to the general-purpose equipment controller 11 via the dedicated transmission line 33, or control-related settings, including management information for the respective equipment of the air conditioning facilities 23.

Specifically, in the air conditioning facilities configuration unit 311, the management address of each piece of equipment in the air conditioning facilities 23 managed by the general-purpose equipment controller 11 is configurable as an address to be managed, and registered (stored) as an address to be managed. The configuration of an address to be managed may also be set according to a predetermined condition, such as by specifying an address range. Note that the registration of management information in the air conditioning facilities manager 305 may also be configured per management address registered as an address to be managed. Additionally, the air conditioning facilities controller 313 controls each piece of equipment in the air conditioning facilities 23 on the basis of information (data) transmitted and input from the air conditioning facilities 23 and the general-purpose equipment 21.

The air conditioning facilities manager 305 conducts a process of sending instruction-related signals and the like to the air conditioning remote control 71, the outdoor unit 51, and the indoor unit 53 via the dedicated transmission line 33, on the basis of signals sent from the general-purpose equipment manager 307, for example. In addition, the air conditioning facilities manager 305 receives signals flowing via the dedicated transmission line 33 to collect data and the like, and conducts a process of sending, to the general-purpose equipment manager 307, data that is determined to be for the general-purpose equipment manager 307. The air conditioning facilities manager 305 sends a signal including data stored by the air conditioning facilities configuration unit 311 to the general-purpose equipment manager 307 at a fixed time interval.

The general-purpose equipment manager 307 is equipped with a general-purpose equipment configuration unit 321, a general-purpose equipment control section 323, and a general-purpose equipment input/output unit 325. The general-purpose equipment configuration unit 321 configures management information, equipment details, or control-related settings for the general-purpose equipment 21 connected to the general-purpose equipment controller 11. The general-purpose equipment configuration unit 321 registers (stores) information required to control or manage the general-purpose equipment 21 as management information. In addition, the general-purpose equipment configuration unit 321 collects and records information that is preregistered as management information from among running and operating information about the general-purpose equipment 21, or detection information from various sensors and actuators of the air conditioning facilities 23 and the general-purpose equipment 21.

Also, the respective equipment of the general-purpose equipment 21 are distinguished by management addresses corresponding to the general-purpose equipment input/output unit 325, and the registration of management information by the general-purpose equipment configuration unit 321 may also be configured per management address. The general-purpose equipment control section 323 controls the general-purpose equipment 21 on the basis of information transmitted and input from the air conditioning facilities 23 and the general-purpose equipment 21. Note that the configuration information of the general-purpose equipment 21 configured by the general-purpose equipment configuration unit 321 may be transmitted from the dedicated communication unit 303 of the general-purpose equipment controller 11 to the energy management gateway 13 via the dedicated transmission line 33.

The general-purpose equipment input/output unit 325 is equipped with a general-purpose equipment input unit 331 and a general-purpose equipment output unit 333. The general-purpose equipment input unit 331 is an input interface with respect to the general-purpose equipment controller 11, into which is input detection information from various sensors (detecting means) of the general-purpose equipment 21 connected to the general-purpose equipment controller 11, such as the temperature/humidity sensor 107, for example, and into which is also input running/operating information of the general-purpose equipment 21. The general-purpose equipment output unit 333 is an output interface from the general-purpose equipment controller 11 with respect to the general-purpose equipment 21, and outputs signals such as a control command when connecting the humidifier 101, the heater 103, and the ventilation fan 105 or the like equipped with an actuator or the like as the general-purpose equipment 21.

The general-purpose equipment control section 323 conducts a process that realizes the functions of the general-purpose equipment controller 11. A sequence of processing instructions is included in the general-purpose equipment control section 323 as an application made up of one or multiple program modules, and the functions of respective devices are realized by executing a program stated in a program module. By storing and executing a program required by each device in a storage unit or the like (not illustrated), processing controller corresponding to each device may be realized. Consequently, it is not necessary to realize processing controller for each device by using specialized design or the like, and the design time may be shortened, for example. In addition, the adding and deleting of functions and the like may be carried out easily.

Note that the general-purpose equipment control section 323 is formed as an updateable program module, for example. Thus, it is possible to implement the general-purpose equipment controller 11 via various media. For example, the general-purpose equipment controller 11 may be implemented by being uploaded via microSD (registered trademark of the SD Association). Also, the general-purpose equipment control section 323 may be implemented by being uploaded to the general-purpose equipment controller 11 via the dedicated communication unit 303 or the general-purpose equipment input unit 331.

Additionally, the general-purpose equipment controller 11 includes a power receiver 301 that receives power from the dedicated transmission line 33, and the dedicated communication unit 303 that communicates with the energy management gateway 13 and the air conditioning facilities 23 operates by receiving power from the power receiver. For this reason, the function of an interface with the energy management gateway 13 and the air conditioning facilities 23 may be realized without providing a separate power supply. Note that the power receiver 301 may also be configured to include a function of supplying electric power to the entire general-purpose equipment controller 11. For example, the power receiver 301 may be connected to an electric utility or receive a supply of electric power from a secondary battery, and thereby supply electric power to the general-purpose equipment controller 11.

The general-purpose equipment controller 11 controls the respective equipment of the air conditioning facilities 23 and the general-purpose equipment 21, on the basis of detection information from various sensors and the like input from the air conditioning facilities 23 and the general-purpose equipment 21, and running information about each piece of equipment in the air conditioning facilities 23 and the general-purpose equipment 21. In addition, when controlling the respective equipment, the equipment controller 304 of the general-purpose equipment controller 11, following the configured linkage control algorithm, transmits control commands from the dedicated communication unit 303 to the indoor unit 53 and the outdoor unit 51 of the air conditioning facilities 23, while also transmitting control commands from the general-purpose equipment input/output unit 325 to the general-purpose equipment 21.

For this reason, rather than having the air conditioning facilities 23 and the general-purpose equipment 21 conduct respectively independent air-conditioning control, the general-purpose equipment controller 11 is used to realize control of the air-conditioning system 1 overall by linking the general-purpose equipment 21 to the air conditioning facilities 23 controlled by dedicated communication via the dedicated transmission line 33.

In addition, since a general-purpose equipment controller 11 that includes a dedicated communication unit 303 is connected to the dedicated transmission line 33, the system configuration of the air conditioning facilities 23 may be utilized without changing the communication scheme used among the existing air conditioning facilities 23, thereby enabling linked control of the air conditioning facilities 23 and the general-purpose equipment 21.

(Air Conditioning Remote Control)

The air conditioning remote control 71 is a remote control that accepts various operating input from an operator, such as starting or stopping the air conditioning facilities 23 and general-purpose equipment 21 connected to the general-purpose equipment controller 11, or configuring a temperature or humidity setting. The air conditioning remote control 71 is connected to the indoor unit 53 via the dedicated transmission line 33. A signal of an operating command such as a setting temperature or an operating mode input by an operator using the air conditioning remote control 71 is transmitted to the indoor unit controller 231.

In addition, the air conditioning remote control 71, the energy management gateway 13, and the general-purpose equipment controller 11 are connected via the indoor unit 53 and the dedicated transmission line 33, and various operating input information, such as starting or stopping the air conditioning facilities 23 and the general-purpose equipment 21, or configuring a temperature or humidity setting, may be transmitted to the general-purpose equipment controller 11 and the energy management gateway 13. The air conditioning remote control 71 includes a general-purpose equipment initializer that initializes general-purpose equipment 21 connected to the general-purpose equipment controller 11, and configures settings of the general-purpose equipment 21 connected to the general-purpose equipment controller 11 on the basis of general-purpose equipment initialization information of the general-purpose equipment controller 11.

Signals based on various operations conducted by an operator via an operating unit 75 or the air conditioning remote control 71, such as an instruction to start or stop the air conditioning facilities 23, general-purpose equipment 21 connected to the general-purpose equipment controller 11, or the like, or a temperature or humidity setting or the like, are sent to the dedicated transmission line 33. Consequently, the starting or stopping and the configuration of a temperature or humidity setting and the like of the air conditioning facilities 23 and the general-purpose equipment 21 is conducted. Also included is a display unit 73 that presents a display based on information (data) included in a signal sent via the dedicated transmission line 33, for example. Herein, by configuring the display unit 73 of the air conditioning remote control 71 as a touch panel type formed by overlaying a touch panel onto a liquid crystal display, for example, the display unit 73 and the operating unit 75 may be integrated, the display screen of the display unit 73 may be switched according to the operating details, and the display may be switched between an operating screen related to the air conditioning facilities 23 and an operating screen related to the general-purpose equipment 21.

When the display of the air conditioning remote control 71 is switched to a general-purpose equipment operating display, there is a displayed a screen that accepts various operating input such as the starting or stopping of general-purpose equipment 21 or the configuration of a temperature or humidity setting by the general-purpose equipment configuration unit 321, and various operating input for the general-purpose equipment 21 is accepted. If operating input for the general-purpose equipment 21 is accepted by the air conditioning remote control 71, operating information is input from the air conditioning remote control 71 into the general-purpose equipment controller 11 via the dedicated transmission line 33. When operating information for the general-purpose equipment 21 is received by the dedicated communication unit 303 of the general-purpose equipment controller 11, the general-purpose equipment control section 323 of the general-purpose equipment controller 11 controls the general-purpose equipment 21 corresponding to the operating information via the general-purpose equipment input/output unit 325.

Additionally, the air conditioning remote control 71 also includes a presence sensor 83, an illumination sensor 81, and a temperature/humidity sensor 85. The presence sensor 83 is detecting means for judging whether or not a person is present near the air conditioning remote control 71. For example, if it is determined that a person is not present, the backlight of the display unit 73 is turned off, whereas if it is determined that a person is present, the backlight is turned on, thereby saving energy. The illumination sensor 81 is means that senses illumination in the vicinity of the air conditioning remote control 71. The temperature/humidity sensor 85 is means that senses the temperature and humidity in the vicinity of the air conditioning remote control 71.

Consequently, the air conditioning remote control 71 may be used to operate not only the indoor unit 53 and the outdoor unit 51 of the air conditioning facilities 23, but also the general-purpose equipment 21 connected to the general-purpose equipment controller 11. Also, since the general-purpose equipment controller 11 and the air conditioning remote control 71 are connected via the dedicated transmission line 33, information about connected general-purpose equipment 21 may also be received from the general-purpose equipment controller 11. In this case, it is possible to reduce the work of initializing general-purpose equipment 21 that may be operated via input from the air conditioning remote control 71, and the configuration work when the general-purpose equipment 21 connected to the general-purpose equipment controller 11 is changed.

Also, although an example is described in which an air conditioning remote control 71 is provided for each indoor unit 53, an air conditioning remote control 71 may also be provided per several indoor units 53, and the number of air conditioning remote controls 71 is not particularly limited.

In Embodiment 1, not only control commands from the energy management gateway 13 to the air conditioning facilities 23 but also control commands from the energy management gateway 13 to the general-purpose equipment 21 may be transmitted via the dedicated transmission line 33, which is a network corresponding to a dedicated protocol unique to each air conditioning manufacturer. For this reason, an existing dedicated transmission line 33 for the air conditioning facilities 23 may be utilized, and in addition, by going through a connection to the general-purpose equipment controller 11, control linking the entire air-conditioning system 1 may be realized with the energy management gateway 13.

Also, by providing the general-purpose equipment controller 11 with an input/output function that controls the general-purpose equipment 21, an air-conditioning system 1 that conducts air-conditioning control linked with a small-scale system may be constructed, without constructing a large-scale system or communication network that encompasses the air conditioning facilities 23 and the general-purpose equipment 21.

Also, in Embodiment 1, both the energy management gateway 13 and the general-purpose equipment controller 11 are able to conduct linked air-conditioning control of the air conditioning facilities 23 and the general-purpose equipment 21, or in other words the entire air-conditioning system 1. For this reason, since linked air-conditioning control of the entire air-conditioning system 1 may be realized by distributing roles between the energy management gateway 13 and the general-purpose equipment controller 11, air-conditioning control adapted to a space subject to air-conditioning such as a building in which the air-conditioning system 1 is installed may be realized.

In addition, since the general-purpose equipment controller 11 and the air conditioning remote control 71 are connected by the dedicated transmission line 33, the air conditioning remote control 71 may be used to receive operating input for the general-purpose equipment 21 connected to the general-purpose equipment controller 11, enabling a user to operate the respective equipment of the air-conditioning system 1 with only the air conditioning remote control 71.

Also, since the energy management gateway 13, the general-purpose equipment controller 11, and the air conditioning remote control 71 are connected by the dedicated transmission line 33, the control details (running details) of the air conditioning facilities 23 and the general-purpose equipment 21 on the energy management gateway 13 and the general-purpose equipment controller 11 may be checked as appropriate using the touch panel of the air conditioning remote control 71, and the running status of each piece of equipment in the air-conditioning system 1 is easily assessed with the air conditioning remote control 71.

Embodiment 2

Embodiment 2, while presupposing the configuration and operation described in Embodiment 1, describes a certain device within the air-conditioning system 1 (for example, the energy management gateway 13) acquiring data transmitted to another device (for example, the general-purpose equipment controller 11), or in other words, eavesdropping operation.

In the related art, when a certain device attempts to acquire data possessed by another device, that certain device requests the other device to transmit a signal including data (management information). Meanwhile, the other device transmits a signal including data (management information) in response to the request from the certain device. In this case, if the same request is made to another device from a plurality of devices, the other device will respectively transmit a signal including the same data in response to the request from each device. For this reason, communication traffic is carelessly increased. Accordingly, the air-conditioning system 1 according to Embodiment 2 is able to minimize communication traffic even in such a case by an operation referred to as eavesdropping described below.

Figure 6:
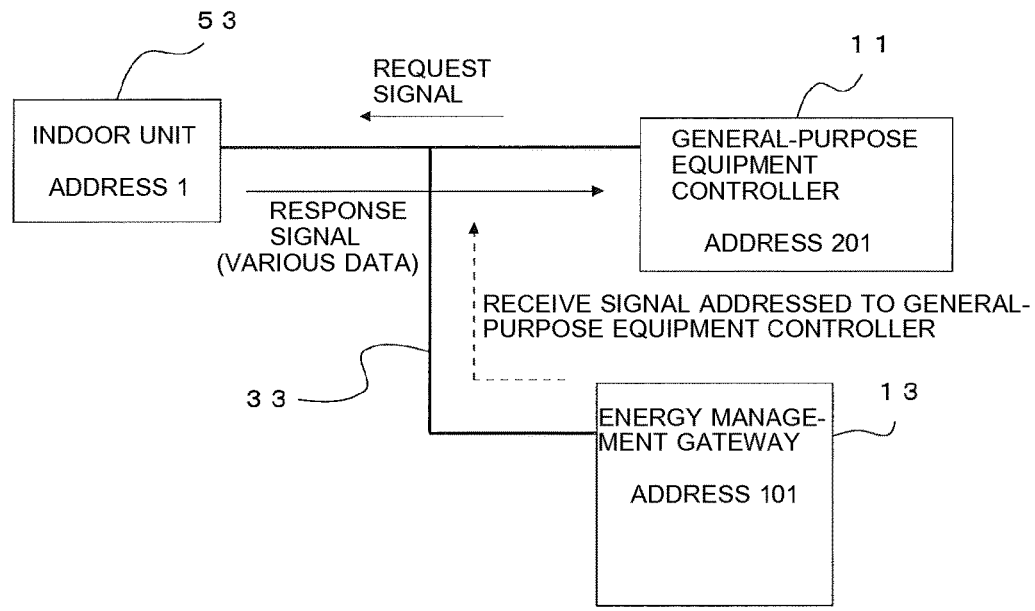
FIG. 6 is a diagram illustrating an example of communication in the air-conditioning system 1 according to Embodiment 2 of the present invention.

FIG. 6 is a diagram illustrating an example of communication in the air-conditioning system 1 according to Embodiment 2 of the present invention. As illustrated in FIG. 6, the indoor unit 53 of the air conditioning facilities 23 is connected to the general-purpose equipment controller 11 and the energy management gateway 13 via the dedicated transmission line 33. Additionally, in the following description, in each device, the transmitting and receiving of signals (data) via the dedicated transmission line 33 is conducted by each communication unit (such as the dedicated communication unit 353 and 303), and a process related to acquiring a signal (data) is conducted by each controller (such as the processing controller 355, the management controller 359, and the equipment controller 304).

Herein, the general-purpose equipment controller 11 and the energy management gateway 13 are devices that respectively and separately monitor and control the air conditioning facilities 23 including the indoor unit 53, and the general-purpose equipment 21. Herein, only the indoor unit 53 of the air conditioning facilities 23 is connected via the dedicated transmission line 33 as an example for describing a method of communicating between devices, but in actual practice, as illustrated in FIG. 1 of Embodiment 1, one or a plurality of outdoor units 51, one or a plurality of indoor units 53, and one or a plurality of air conditioning remote controls 71 of the air conditioning facilities 23 are respectively connected. Herein, suppose that the general-purpose equipment controller 11 and the energy management gateway 13 each require various data (including management information) about the running status and the like of the indoor unit 53 possessed by the indoor unit 53, such as intake temperature data, for example.

The general-purpose equipment controller 11 transmits, to the indoor unit 53 via the dedicated transmission line 33, a request signal, that is, a signal requesting the transmission of a signal that includes management information required to manage the air-conditioning system 1 from among various data about the running status of the indoor unit 53 or detection information (signals) from sensors, such as the intake temperature, for example (hereinafter, a signal that includes various data to send to another device in response to a request signal will be designated a response signal). When transmitting signals, including the request signal, along the dedicated transmission line 33, signals are sent in a format conforming to a preconfigured communication frame on the basis of the protocol or the like dedicated to the air conditioning facilities 23, as illustrated in FIG. 7, for example.

Figure 7:
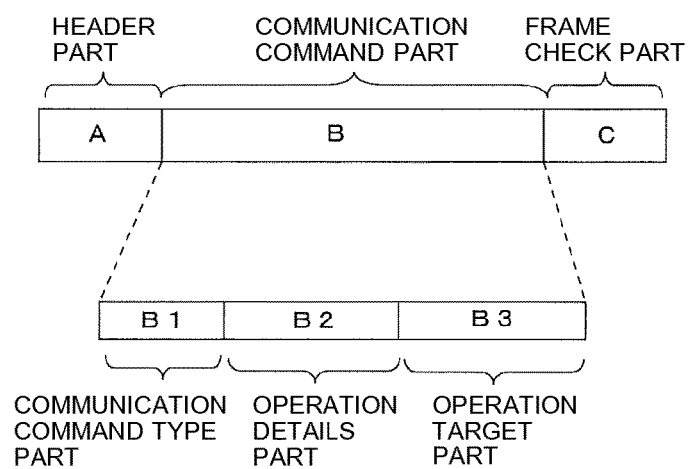
FIG. 7 is a diagram illustrating an example of a communication frame that is communicated in the air-conditioning system 1 according to Embodiment 2 of the present invention.

FIG. 7 is a diagram illustrating an example of a communication frame that is communicated in the air-conditioning system 1 according to Embodiment 2 of the present invention. As illustrated in FIG. 7, a communication frame is data formed in a format conforming to a predetermined protocol, and is made up of a header part A that includes real data such as a source address, a destination address, and the datagram length of a communication command, a communication command part B, and a frame check part C that includes a code or the like that detects transmission errors, for example.

The communication command part B is made up of a communication command type part B1 that indicates the type of operating details or target of the control/monitoring, an operation details part B2 that expresses the running and operating details of the control/monitoring, an operation target part B3 that expresses the operation target of the control/monitoring, and the like. Note that the communication frame described above illustrates one example, and that the format is not particularly limited thereto.

The general-purpose equipment controller 11 acquires management information required to manage the air-conditioning system 1 from the indoor unit 53. For example, the general-purpose equipment controller 11 receives a signal (communication frame) that includes intake temperature data, and acquires the intake temperature data.

As discussed above, suppose that the energy management gateway 13, similarly to the general-purpose equipment controller 11, requires management information required to manage the air-conditioning system 1 from among various data about the running status of the indoor unit 53 and the like possessed by the indoor unit 53, such as intake temperature data, for example. Regardless of which device is the destination of a signal, a signal sent along the dedicated transmission line 33 is also sent to the energy management gateway 13. Accordingly, on the basis of a signal received via the dedicated transmission line 33, the energy management gateway 13 determines the source address and the communication command. Subsequently, after determining that the source address represents the indoor unit 53 and that the communication command is in response to a request signal for intake temperature data, the energy management gateway 13 receives and processes the signal to acquire the intake temperature data.

Embodiment 2 herein supposes that the general-purpose equipment controller 11 transmits a request signal, while the energy management gateway 13 acquires data about the intake temperature of the indoor unit 53 on the basis of the source address (management address) and the communication command (management information in a command), but Embodiment 2 is not limited to the above. For example, the general-purpose equipment controller 11 may also acquire data about the intake temperature of the indoor unit 53 on the basis of a signal in response to a request signal transmitted by the energy management gateway 13.

Also, in Embodiment 2, data about the intake temperature is acquired from among the various data about the running status of the indoor unit 53 and the like, but the data to be acquired is not limited to data about the indoor unit 53, and the general-purpose equipment controller 11 or the energy management gateway 13 may also acquire required management information (data) collectively or individually. In this case, the general-purpose equipment controller 11 or the energy management gateway 13 determines whether or not the data is management information (data) useful for managing the air-conditioning system 1, on the basis of the source address and the communication command in the signal.

As above, according to Embodiment 2, the energy management gateway 13 receives a signal flowing via the dedicated transmission line 33, such as a signal going from the indoor unit 53 to the general-purpose equipment controller 11, and on the basis of the source address and the communication command in the signal, acquires intake temperature data in the signal. As a result, the energy management gateway 13 is able to acquire intake temperature data even without transmitting a request signal. Also, since it is not necessary to send a signal from the indoor unit 53 for every request signal, the communication traffic of the overall air-conditioning system 1 may be reduced.

Also, the above describes using data about the intake temperature among preregistered management information, but by conducting a similar process on preregistered management information on the basis of the source address (management address) and communication command in a signal, required management information (data) may be acquired efficiently, and in addition, the communication traffic of the overall air-conditioning system 1 may be reduced.

In addition, management information (signals) flowing via the dedicated transmission line may be acquired in a timely manner, regardless of the communication cycle of request signals from the energy management gateway 13, thereby enabling rapid acquisition of management information by the energy management gateway 13 and the general-purpose equipment controller 11.

Embodiment 3

Embodiment 3, while presupposing the configuration and operation described in Embodiment 1, describes a certain piece of equipment within the air-conditioning system 1 (for example, the general-purpose equipment controller 11 and the energy management gateway 13) acquiring data transmitted to another piece of equipment (for example, the outdoor unit 51), or in other words, another practical example of eavesdropping operation.

Figure 8:
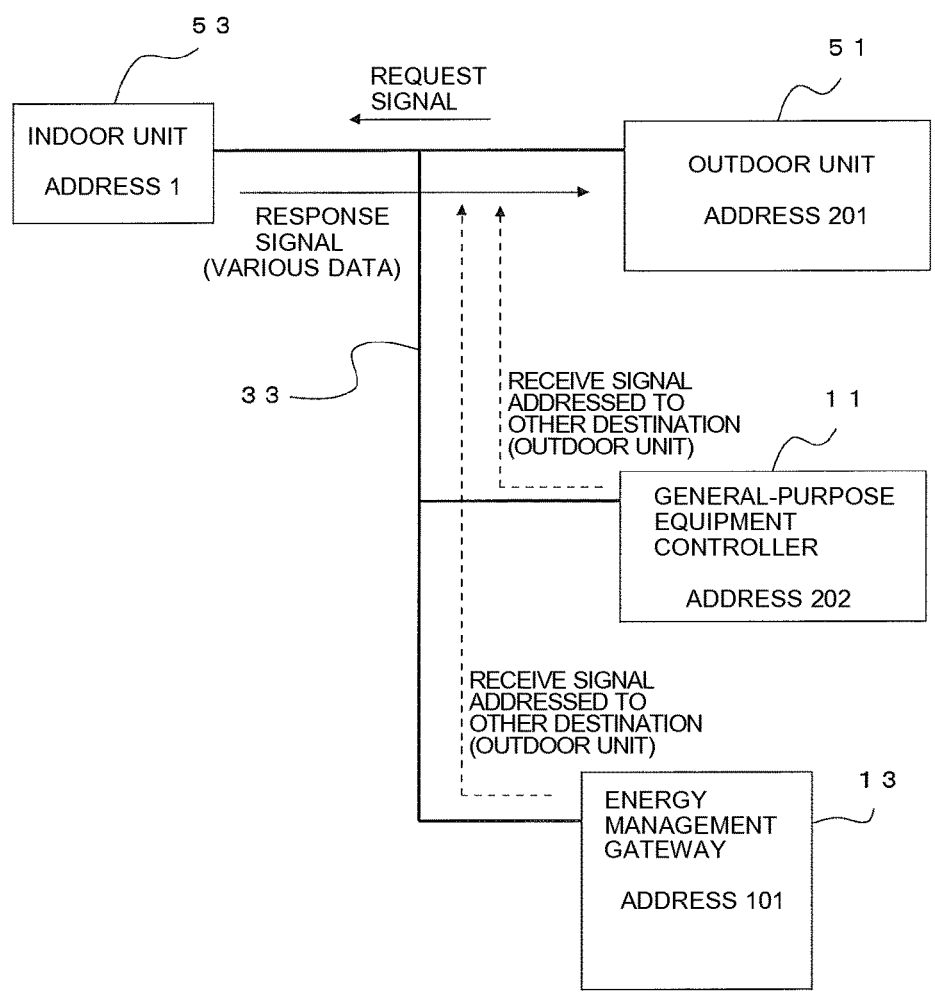
FIG. 8 is a diagram illustrating an example of communication in the air-conditioning system 1 according to Embodiment 3 of the present invention.

FIG. 8 is a diagram illustrating an example of communication in the air-conditioning system 1 according to Embodiment 3 of the present invention. As illustrated in FIG. 8, the indoor unit 53 of the air conditioning facilities 23 is connected to the outdoor unit 51, the general-purpose equipment controller 11 and the energy management gateway 13 via the dedicated transmission line 33.

In the following description, in each piece of equipment, the transmitting and receiving of signals (data) via the dedicated transmission line 33 is conducted by each communication unit (such as the dedicated communication unit 353, the dedicated communication unit 303, the outdoor unit communicating unit 133, and the indoor unit communicating unit 233). Also, in the following description, in each piece of equipment, a process related to acquiring a signal (data) is conducted by each controller (such as the processing controller 355, the management controller 359, and the equipment controller 304). Also, the general-purpose equipment controller 11 and the energy management gateway 13 are described as equipment that respectively and separately monitor and control the air conditioning facilities 23 including the indoor unit 53, and the general-purpose equipment 21.

Herein, only the indoor unit 53 and the outdoor unit 51 of the air conditioning facilities 23 are connected via the dedicated transmission line 33 as an example for describing a method of communicating between equipment, but in actual practice, as illustrated in FIG. 1 of Embodiment 1, one or a plurality of outdoor units 51, one or a plurality of indoor units 53, and one or a plurality of air conditioning remote controls 71 of the air conditioning facilities 23 are connected. Additionally, the general-purpose equipment controller 11 and the energy management gateway 13 are configured to hold the same data as the outdoor unit 51 with regards to management information.

The outdoor unit 51 transmits, to the indoor unit 53 via the dedicated transmission line 33, a request signal, that is, a signal requesting the transmission of a signal that includes data from among the various data about the running status of the indoor unit 53 or detections from sensors, such as the intake temperature, for example. The indoor unit 53 receives the request signal, and replies with a signal including data held in the indoor unit 53 itself to the outdoor unit 51 via the dedicated transmission line 33. When transmitting and receiving, signals are sent in a format conforming to a communication frame preconfigured on the basis of a dedicated protocol or the like, as described in Embodiment 2. The outdoor unit 51 receives the signal including data about the intake temperature (management information such as the running status) from the indoor unit 53, and acquires intake temperature data.

As discussed earlier, the general-purpose equipment controller 11 and the energy management gateway 13 are configured to hold management information required to manage the air-conditioning system 1, such as data about the intake temperature, for example, in the same way as the outdoor unit 51. Accordingly, on the basis of a signal received via the dedicated transmission line 33, the general-purpose equipment controller 11 and the energy management gateway 13 determine the destination address and the communication command. Subsequently, after determining that the destination address represents the outdoor unit 51 and that the communication command is a response signal in response to a request signal for intake temperature data, the general-purpose equipment controller 11 and the energy management gateway 13 receive and process the signal to acquire the intake temperature data.

As above, in Embodiment 3, the general-purpose equipment controller 11 and the energy management gateway 13 are configured to receive a signal flowing via the dedicated transmission line 33, and on the basis of a destination address and a communication command in the signal, acquire various data in the signal. Thus, if the destination is the outdoor unit 51, for example, the same data may be acquired. For this reason, even if a plurality of equipment having controller functions, such as the general-purpose equipment controller 11 and the energy management gateway 13, are connected to the dedicated transmission line 33 in addition to the outdoor unit 51 and the indoor unit 53, the communication traffic of the overall air-conditioning system 1 may be minimized.

Also, the above describes using data about the intake temperature among preregistered management information, but by conducting a similar process on all preregistered management information on the basis of the destination address (management address) and communication command in a signal, required management information (data) may be acquired efficiently, and in addition, the communication traffic of the overall air-conditioning system 1 may be reduced.

Also, management information (signals) flowing via the dedicated transmission line may be acquired in a timely manner, regardless of the communication cycle of request signals from the general-purpose equipment controller 11 and the energy management gateway 13. Thus, rapid acquisition of management information by the general-purpose equipment controller 11 and the energy management gateway 13 becomes possible.

Embodiment 4

Embodiment 4, while presupposing the configuration and operation described in Embodiment 1, describes a certain piece of equipment within the air-conditioning system 1 (for example, the general-purpose equipment controller 11 and the energy management gateway 13) acquiring data transmitted to another piece of equipment (for example, the outdoor unit 51), or in other words, another practical example of eavesdropping operation.

Figure 9:
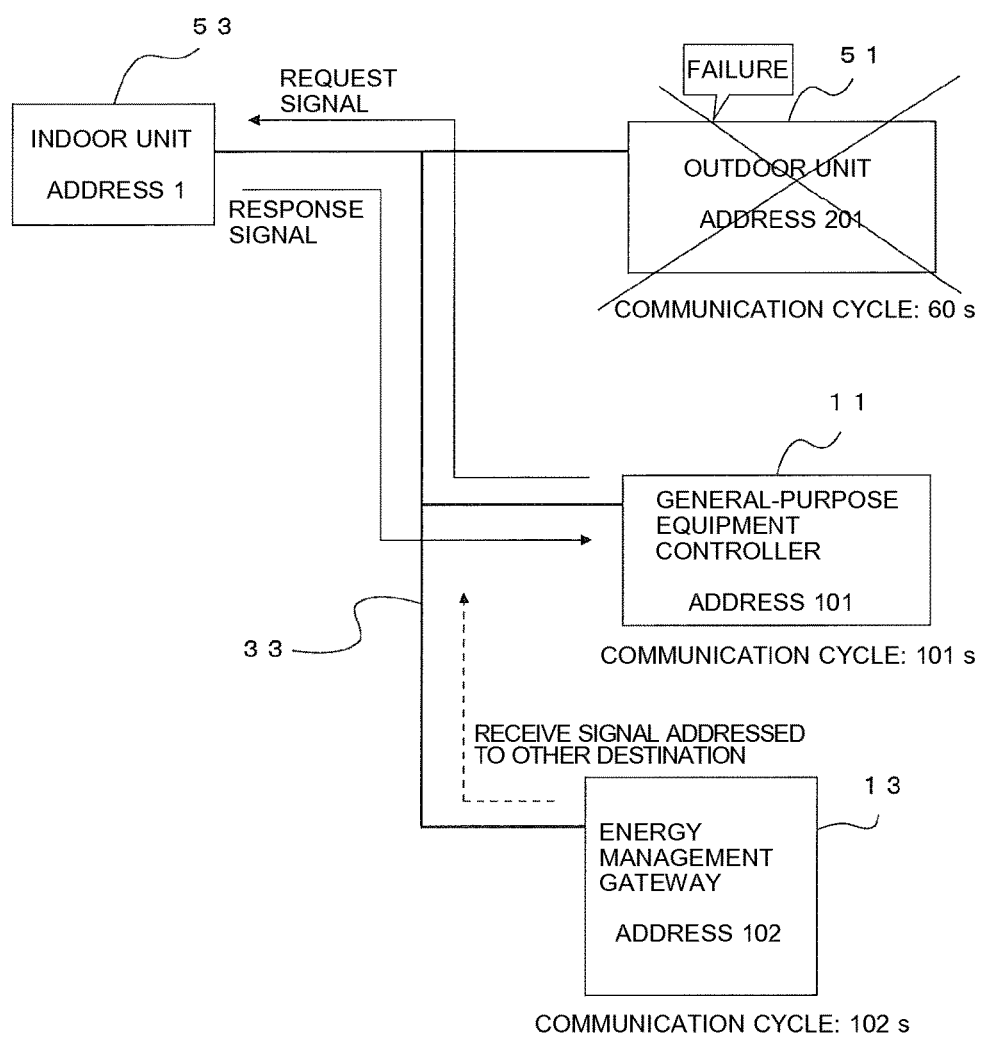
FIG. 9 is a diagram illustrating an example of communication in the air-conditioning system 1 according to Embodiment 4 of the present invention.

FIG. 9 is a diagram illustrating an example of communication in the air-conditioning system 1 according to Embodiment 4 of the present invention. As illustrated in FIG. 9, the indoor unit 53 of the air conditioning facilities 23 is connected to the outdoor unit 51, the general-purpose equipment controller 11 and the energy management gateway 13 via the dedicated transmission line 33.

In the following description, in each piece of equipment, the transmitting and receiving of signals (data) via the dedicated transmission line 33 is conducted by each communication unit (such as the dedicated communication unit 353, the dedicated communication unit 303, the outdoor unit communicating unit 133, and the indoor unit communicating unit 233). Also, in the following description, in each piece of equipment, a process related to acquiring a signal (data) is conducted by each controller (such as the processing controller 355, the management controller 359, and the equipment controller 304). Also, the general-purpose equipment controller 11 and the energy management gateway 13 are described as equipment that respectively and separately monitor and control the air conditioning facilities 23 including the indoor unit 53, and the general-purpose equipment 21.

Herein, only the indoor unit 53 and the outdoor unit 51 of the air conditioning facilities 23 are connected via the dedicated transmission line 33 as an example for describing a method of communicating between equipment, but in actual practice, as illustrated in FIG. 1 of Embodiment 1, one or a plurality of outdoor units 51, one or a plurality of indoor units 53, and one or a plurality of air conditioning remote controls 71 of the air conditioning facilities 23 are connected.

At this point, suppose that the outdoor unit 51, the general-purpose equipment controller 11, and the energy management gateway 13 include a timekeeping device such as a timer. Embodiment 4 relates to a process or the like of the general-purpose equipment controller 11 and the energy management gateway 13 when a failure or the like occurs in the outdoor unit 51 that was sending request signals to the indoor unit 53.

For example, the outdoor unit 51 is a piece of equipment that displays various data about the running status of the indoor unit 53 or detection information (signals) from sensors, such as displaying the intake temperature, for example, and needs to acquire data periodically about every 60 seconds in order to obtain various data and the like. On the other hand, since the energy management gateway 13 and the general-purpose equipment controller 11 do not need to update the display as frequently as the outdoor unit 51, the periodic acquisition of intake temperature data may be approximately every 100 seconds.

Accordingly, the energy management gateway 13 and the general-purpose equipment controller 11 transmit request signals on a longer cycle than the cycle on which the outdoor unit 51 transmits request signals. Subsequently, after intake temperature data is acquired, the timekeeping device is reset. Herein, different cycles (times) are configured, with the communication cycle of request signals from the general-purpose equipment controller 11 being set to 101 seconds, for example, and the communication cycle of request signals from the energy management gateway 13 being set to 102 seconds, for example. By making the request signal communication cycles different in this way, the general-purpose equipment controller 11 and the energy management gateway 13 are configured not to transmit request signals to the indoor unit 53 at the same time. The communication cycles herein are merely examples, and are not limited to being a number of seconds or the like.

The outdoor unit 51 transmits a request signal to the indoor unit 53 every 60 seconds, and the indoor unit 53 transmits a signal including intake temperature data via the dedicated transmission line. The general-purpose equipment controller 11 and the energy management gateway 13 receive the signal, acquire the intake temperature data, and reset a timekeeping device. For this reason, it is basically unnecessary for the general-purpose equipment controller 11 and the energy management gateway 13 to transmit request signals to the air conditioning facilities 23.

However, as illustrated in FIG. 9, in some cases the general-purpose equipment controller 11 or the energy management gateway 13 may be unable to acquire intake temperature data due to some factor such as a failure in the outdoor unit 51, or the effects of external noise during data transmission. In this case, suppose that the general-purpose equipment controller 11 is unable to acquire data. At this point, the general-purpose equipment controller 11 transmits a request signal to the indoor unit 53.

The indoor unit 53 receives the request signal from the general-purpose equipment controller 11, and transmits a signal including intake temperature data to the general-purpose equipment controller 11 via the dedicated transmission line 33. The general-purpose equipment controller 11 receives the signal including intake temperature data from the indoor unit 53, and acquires the intake temperature data. Meanwhile, the energy management gateway 13 acquires the intake temperature data on the basis of the source address and the communication command in the received signal. Subsequently, if the outdoor unit starts transmitting request signals every 60 seconds again, the general-purpose equipment controller 11 and the energy management gateway 13 are able to acquire intake temperature data without transmitting a request signal, since the general-purpose equipment controller 11 and the energy management gateway 13 are on a longer cycle related to request signal transmission.

Note that although the request signal communication cycles of the outdoor unit 51, the general-purpose equipment controller 11, and the energy management gateway 13 are taken to be 60 seconds, 101 seconds, and 102 seconds, respectively, the communication cycle of each piece of equipment may also be switched as appropriate. Also, although in this case a judgment process based on the source address and the communication command is conducted, a judgment may also be made on the basis of the destination address and the communication command, similarly to Embodiment 3.

As above, according to an air-conditioning system 1 in accordance with Embodiment 4, the general-purpose equipment controller 11 and the energy management gateway 13 are configured with a request signal communication cycle that is reset whenever intake temperature data is acquired, and are configured to transmit a request signal at the end of the communication cycle. Thus, in the air-conditioning system 1 according to Embodiment 4, a request signal may be transmitted and intake temperature data may be acquired even if intake temperature data cannot be acquired on the basis of a signal addressed to the outdoor unit 51, for example. In Embodiment 4, other equipment that did not transmit a request signal may acquire intake temperature data on the basis of a signal flowing via the dedicated transmission line 33, thereby enabling the traffic of the overall air-conditioning system 1 to be minimized. In this case, in Embodiment 4, if different communication cycles are configured for the other equipment that did not transmit a request signal, the possibility of transmitting a request signal at the same time becomes extremely low, and signal collisions or the like may be prevented.

Embodiment 5

Embodiment 5 describes an update process for configuring (obtaining) and updating a management address and management information for the respective equipment of the air conditioning facilities 23 and the general-purpose equipment 21 connected via the dedicated transmission line 33 in the general-purpose equipment controller 11 described in Embodiment 1.

Figure 10:
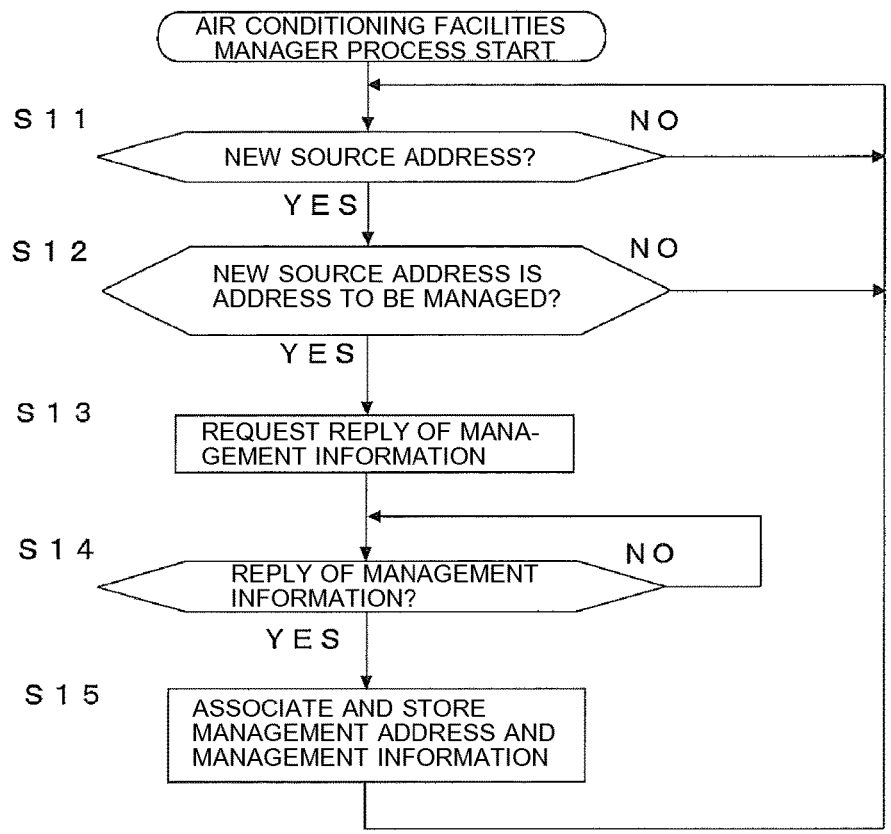
FIG. 10 is a flowchart illustrating exemplary control of a general-purpose equipment controller 11 according to Embodiment 5 of the present invention.

FIG. 10 is a flowchart illustrating an example of control by the general-purpose equipment controller 11 according to Embodiment 5, and illustrates an example of a processing sequence related to obtaining a management address and management information for a piece of equipment to be newly managed or controlled among the air conditioning facilities 23 by the air conditioning facilities manager 305 (air conditioning facilities controller 313). FIG. 10 will be used to describe a process in a case in which, when the general-purpose equipment controller 11 receives a signal flowing via the dedicated transmission line 33, the source address extracted from the received signal (data) is a new address.

After the dedicated communication unit 303 of the general-purpose equipment controller 11 receives a signal flowing via the dedicated transmission line 33, in step S11, the air conditioning facilities manager 305 determines whether or not there is a new source address. A new source address refers to a source address that is received for the first time at the general-purpose equipment controller 11. If the source address is a new source address, the air conditioning facilities manager 305 proceeds to step S12. On the other hand, if the source address is not a new source address, the air conditioning facilities manager 305 returns to step S11.

In step S12, the air conditioning facilities manager 305 determines whether or not the new source address is an address to be managed. An address to be managed refers to a management address of a piece of equipment among the air conditioning facilities 23 that is registered in the air conditioning facilities manager 305 and managed by the general-purpose equipment controller 11. As described in Embodiment 1, addresses to be managed are preconfigured by the air conditioning facilities configuration unit 311. If the new source address is an address to be managed, the air conditioning facilities manager 305 proceeds to step S13. On the other hand, if the new source address is not an address to be managed, the air conditioning facilities manager 305 returns to step S11.

In step S13, the air conditioning facilities manager 305 issues, to the new source address via the dedicated communication unit 303, a request for a reply of management information to be preregistered in the air conditioning facilities manager 305. If management information is registered for each management address of a piece of equipment among the air conditioning facilities 23, the air conditioning facilities manager 305 is able to batch request the management information required for the equipment identified by the relevant management address.

In step S14, the air conditioning facilities manager 305 determines whether or not there is a reply of management information from the new source address. If there is a reply of management information, the air conditioning facilities manager 305 proceeds to step S15. On the other hand, if there is no reply of management information, the air conditioning facilities manager 305 returns to step S14. In step S15, the air conditioning facilities controller 313 associates and stores the management address (new source address) and management information, and returns to step S11.

According to the above, the general-purpose equipment controller 11 is able to store management information for each newly installed piece of equipment among the air conditioning facilities 23, in association with a management address. In addition, even when a piece of equipment among the air conditioning facilities 23 is updated or added, it is possible to obtain management information associated with the management address on the general-purpose equipment controller 11 side on the basis of communication from the new source address which is the management address of the relevant piece of equipment, and management and control of a piece of equipment to be managed may be realized by the general-purpose equipment controller 11 while reflecting the updating and adding of a piece of equipment among the air conditioning facilities 23.

Also, although the above describes the air conditioning facilities manager 305 obtaining a management address and management information of a new piece of equipment to be managed or controlled among the air conditioning facilities 23, the general-purpose equipment manager 307 may be configured to similarly obtain a management address and management information of a new piece of equipment to be managed or controlled among the general-purpose equipment 21, on the basis of a signal input into the general-purpose equipment input/output unit 325.

Figure 11:
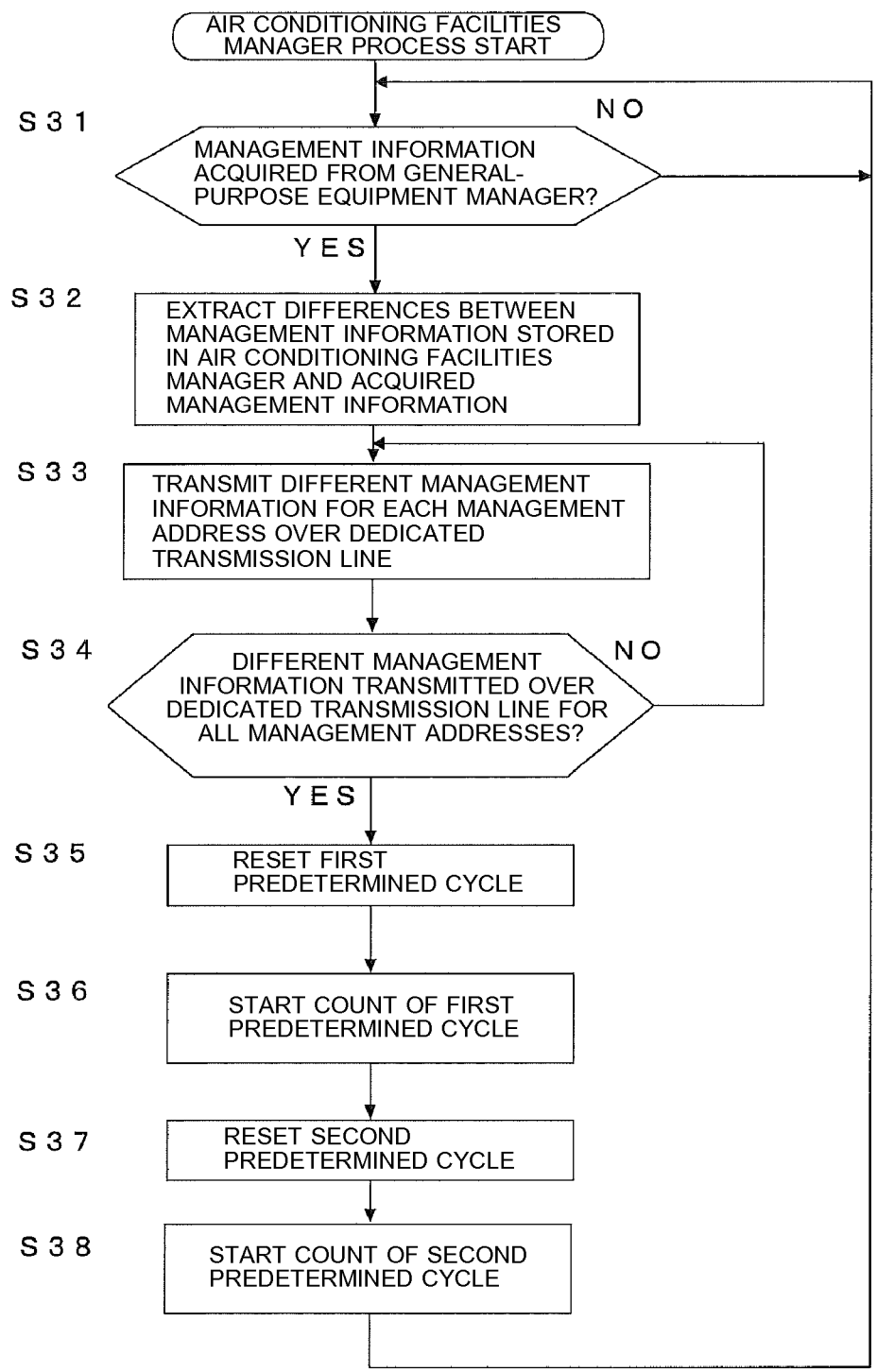
FIG. 11 is a flowchart illustrating exemplary control of a general-purpose equipment controller 11 according to Embodiment 5 of the present invention.

Next, regarding the management address and management information of a piece of equipment among the air conditioning facilities 23 to be managed or controlled by the general-purpose equipment controller 11, a process will be described in which the air conditioning facilities manager 305 updates the management information of a piece of equipment among the air conditioning facilities 23 in the general-purpose equipment manager 307, after the air conditioning facilities manager 305 collects management information via the dedicated communication unit 303. FIG. 11 is a flowchart illustrating an example of control by the general-purpose equipment controller 11 according to Embodiment 5, and illustrates an example of a processing sequence by the air conditioning facilities manager 305 with respect to a change of management information.

Herein, control of the air conditioning facilities 23 in the air-conditioning system 1 that is based on a signal flowing inside the air-conditioning system 1, such as management information, for example, is prioritized. Thus, a process related to updating management information of the air conditioning facilities 23 in the general-purpose equipment manager 307 is lower in priority than the process of the air conditioning facilities manager 305 collecting management information and the transmission process of the dedicated communication unit 303. According to such a configuration, a process related to updating management information in the general-purpose equipment manager 307 is executed when the collection process and the transmission process are not being conducted, and thus the updating of management information in the general-purpose equipment manager 307 may be conducted without affecting the control of the air conditioning facilities 23 in the air-conditioning system 1.

In addition, by updating the management address and the management information of each piece of equipment among the air conditioning facilities 23 in the general-purpose equipment manager 307, the equipment controller 304 of the general-purpose equipment controller 11 is able to realize linked control of the air conditioning facilities 23 and the general-purpose equipment 21 on the basis of the management information.

In step S31, the air conditioning facilities manager 305 of the general-purpose equipment controller 11 determines whether or not management information stored in the general-purpose equipment manager 307 has been acquired (obtained). If management information has been acquired from the general-purpose equipment manager 307, the air conditioning facilities manager 305 proceeds to step S32. On the other hand, if management information from the general-purpose equipment manager 307 is not acquired, the air conditioning facilities manager 305 returns to step S31.

In step S32, the air conditioning facilities manager 305 extracts differences between the management information stored in the air conditioning facilities manager 305 and the management information acquired from the general-purpose equipment manager 307. At this point, the air conditioning facilities manager 305 associates and stores the management addresses and management information of equipment to be managed or controlled, and also extracts management addresses related to extracted management information that differs.

In step S33, the air conditioning facilities manager 305 transmits, via the dedicated communication unit 303, the different management information for an extracted management address on the dedicated transmission line 33, with the relevant piece of equipment among the air conditioning facilities 23 identified by the extracted management address as the destination.

In step S34, the air conditioning facilities manager 305 determines whether or not different management information has been transmitted on the dedicated transmission line 33 for all extracted management addresses. If different management information has been transmitted on the dedicated transmission line 33 for all management addresses, the air conditioning facilities manager 305 proceeds to step S35. On the other hand, if different management information has not been transmitted on the dedicated transmission line 33 for all management addresses, the air conditioning facilities manager 305 returns to step S33.

In step S35, the air conditioning facilities manager 305 resets a first predetermined cycle. In step S36, the air conditioning facilities manager 305 starts a count of the first predetermined cycle. In step S37, the air conditioning facilities manager 305 resets a second predetermined cycle. In step S38, the air conditioning facilities manager 305 starts a count of the second predetermined cycle, and returns to step S31.

Herein, the first predetermined cycle refers to the cycle on which to conduct dedicated protocol communication with each piece of equipment among the air conditioning facilities 23. The air conditioning facilities manager 305 of the general-purpose equipment controller 11 collects management information for each piece of equipment among the air conditioning facilities 23 in intervals of the first predetermined cycle. Meanwhile, the second predetermined cycle refers to the cycle on which the air conditioning facilities manager 305 collectively updates management information in the general-purpose equipment manager 307. As described above, differences between the management information stored in the air conditioning facilities manager 305 and the management information acquired from the general-purpose equipment manager 307 are batch updated.

In addition, the second predetermined cycle is configured to be a longer cycle than the first predetermined cycle, or in other words, so as to establish a relationship in which the first predetermined cycle is less than the second predetermined cycle.

By configuring the two cycles of the first predetermined cycle and the second predetermined cycle so as to establish a relationship in which the first predetermined cycle is less than the second predetermined cycle, management information (data) is transferred from the air conditioning facilities manager 305 to the general-purpose equipment manager 307 after the management information from each piece of equipment among the air conditioning facilities 23 is reliably collected (acquired) by the air conditioning facilities manager 305 of the general-purpose equipment controller 11, thereby updating the management information in the general-purpose equipment manager 307.

In addition, since a process related to updating management information in the general-purpose equipment manager 307 is executed on a cycle (timing) at which the air conditioning facilities manager 305 is not conducting the process of collecting management information and the dedicated communication unit 303 is not conducting a transmission process, the updating of management information in the general-purpose equipment manager 307 may be conducted without affecting the control of each piece of equipment among the air conditioning facilities 23 in the air-conditioning system 1.

Figure 12:
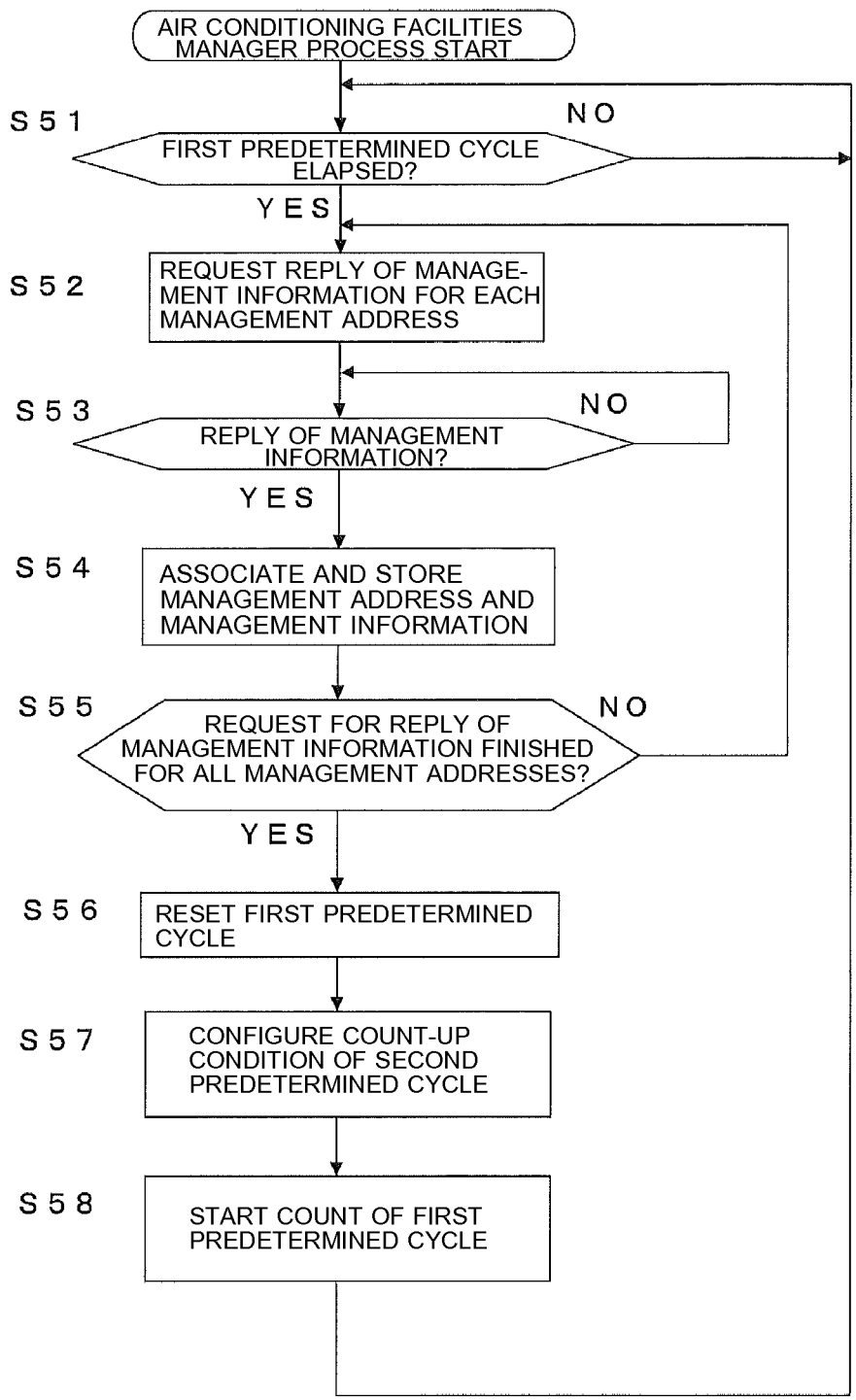
FIG. 12 is a flowchart illustrating exemplary control of a general-purpose equipment controller 11 according to Embodiment 5 of the present invention.

Next, a processing sequence by which the air conditioning facilities manager 305 of the general-purpose equipment controller 11 collects management information for each piece of equipment among the air conditioning facilities 23 to be managed or controlled, conducted on every first predetermined cycle on which to conduct dedicated protocol communication with each piece of equipment among the air conditioning facilities 23, will be described. FIG. 12 is a flowchart illustrating an example of control by the general-purpose equipment controller 11 according to Embodiment 5, and illustrates an example of a management information collecting sequence conducted every first predetermined cycle.

In step S51, the air conditioning facilities manager 305 of the general-purpose equipment controller 11 determines whether or not the first predetermined cycle has elapsed. If the first predetermined cycle has elapsed, the air conditioning facilities manager 305 proceeds to step S52. On the other hand, if the first predetermined cycle has not elapsed, the air conditioning facilities manager 305 returns to step S51.

In step S52, the air conditioning facilities manager 305 requests a reply of management information for each management address, with the management address identifying each piece of equipment among the air conditioning facilities 23 to be managed or controlled as the destination. Note that although the above describes an example of requesting a reply of management information for each management address, a batch reply of the required management information may also be requested.

In step S53, the air conditioning facilities manager 305 determines whether or not there is a reply of management information. If there is a reply of management information, the air conditioning facilities manager 305 proceeds to step S54. On the other hand, if there is no reply of management information, the air conditioning facilities manager 305 returns to step S53. At this point, the air conditioning facilities manager 305 extracts data from a signal flowing via the dedicated transmission line 33 via the dedicated communication unit 303. Herein, a signal flowing via the dedicated transmission line is in a format conforming to a preconfigured communication format as described in Embodiment 2, for example, and data in the communication frame includes a source address, a destination address, and a communication command (real data).

In step S54, the air conditioning facilities manager 305 associates and stores a management address and management information on the basis of management information replied from the management address of a piece of equipment among the air conditioning facilities 23. The management address is the source address included in a signal corresponding to a reply, for example.

In step S55, the air conditioning facilities manager 305 determines whether or not the requesting of a reply of management information has finished for all management addresses among the air conditioning facilities 23 to be managed or controlled. If the requesting of a reply of management information has finished for all management addresses, the air conditioning facilities manager 305 proceeds to step S56. On the other hand, if the requesting of a reply of management information has not finished for all management addresses, the air conditioning facilities manager 305 returns to step S52.

In step S56, the air conditioning facilities manager 305 resets the first predetermined cycle. In step S57, the air conditioning facilities manager 305 configures a count-up condition of the second predetermined cycle. Herein, the second predetermined cycle is the cycle on which management information (data) is transferred from the air conditioning facilities manager 305 to the general-purpose equipment manager 307 to update the management information in the general-purpose equipment manager 307. As described earlier, the second predetermined cycle is configured to be a longer cycle than the first predetermined cycle, or in other words, so as to establish a relationship in which the first predetermined cycle is less than the second predetermined cycle. In step S58, the air conditioning facilities controller 313 starts a count of the first predetermined cycle, and returns to step S51.

Figure 13:
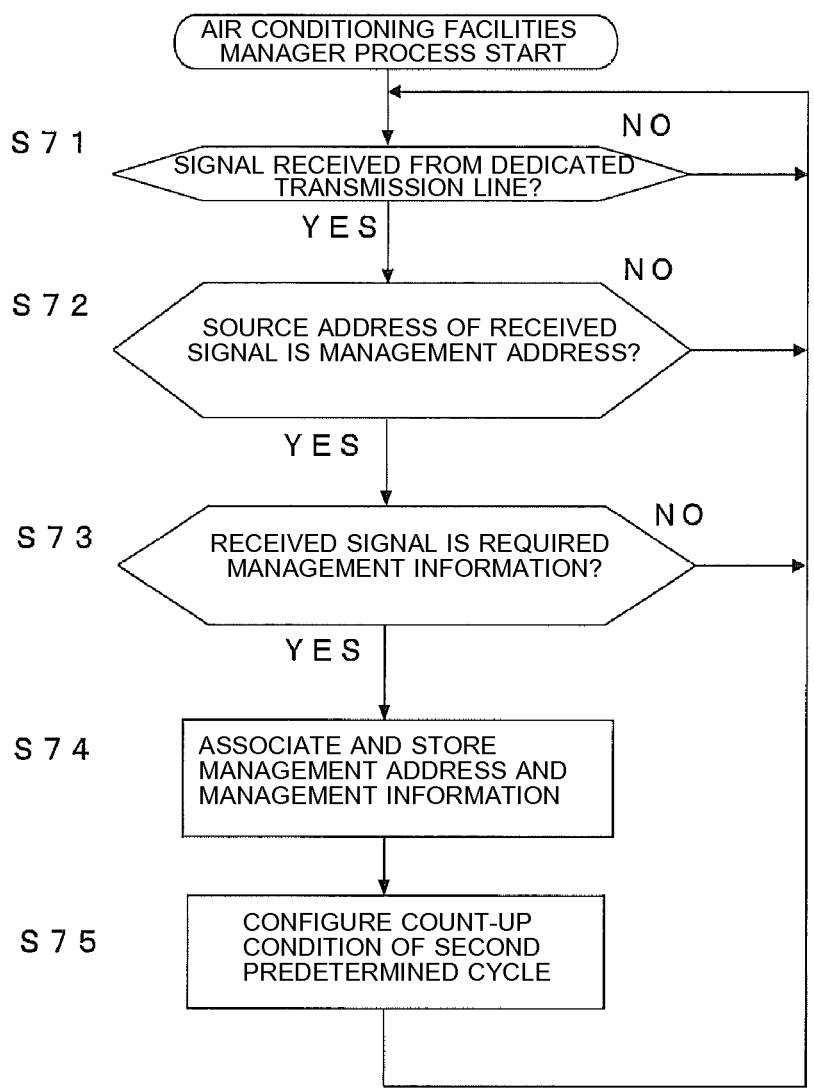
FIG. 13 is a flowchart illustrating exemplary control of a general-purpose equipment controller 11 according to Embodiment 5 of the present invention.

Next, FIG. 13 will be used to describe a processing sequence in which the air conditioning facilities manager 305 collects management information for each piece of equipment among the air conditioning facilities 23 according to the so-called eavesdropping operation described in Embodiments 2 to 4, regardless of the first cycle described in the flowchart of FIG. 12.

FIG. 13 is a flowchart illustrating an example of control by the general-purpose equipment controller 11 according to Embodiment 5, and illustrates an example of a collecting sequence that is irrespective of the first predetermined cycle. Note that the process illustrated in FIG. 13 presupposes that all equipment connected to the dedicated transmission line 33 is basically able to receive various signals flowing via the dedicated transmission line 33.

In step S71, the air conditioning facilities manager 305 of the general-purpose equipment controller 11 determines whether or not a signal has been received from the dedicated transmission line 33. If a signal has been received from the dedicated transmission line 33, the air conditioning facilities manager 305 proceeds to step S72. On the other hand, if a signal has not been received from the dedicated transmission line 33, the air conditioning facilities manager 305 returns to step S71.

In step S72, the air conditioning facilities manager 305 determines whether or not the source address of the received signal is a management address. If the source address of the received signal is a management address, the air conditioning facilities manager 305 proceeds to step S73. On the other hand, if the source address of the received signal is not a management address, the air conditioning facilities manager 305 returns to step S71.

In step S73, the air conditioning facilities manager 305 determines from the communication command whether or not the signal is required management information. If the received signal is required management information, the air conditioning facilities manager 305 proceeds to step S74. On the other hand, if the received signal is not required management information, the air conditioning facilities manager 305 returns to step S71.

In step S74, the air conditioning facilities manager 305 associates and stores a management address and management information on the basis of management information replied from the management address of a piece of equipment among the air conditioning facilities 23. In step S75, the air conditioning facilities controller 313 configures a count-up condition of the second predetermined cycle, and returns to step S71. Herein, the second predetermined cycle is configured to be a longer cycle than the first predetermined cycle, or in other words, so as to establish a relationship in which the first predetermined cycle is less than the second predetermined cycle.

As above, according to Embodiment 5, the general-purpose equipment controller 11 receives a signal flowing via the dedicated transmission line 33, such as a signal from the indoor unit 53 to the outdoor unit 51, for example, and is configured to acquire management information in the signal on the basis of a source address (management address) and a communication address (management information in the command) in the signal. For this reason, the general-purpose equipment controller 11 is able to acquire management information without transmitting a request signal. In addition, since it is not necessary to send a signal from each piece of equipment among the air conditioning facilities 23 for every request signal from the general-purpose equipment controller 11, the communication traffic of the overall air-conditioning system 1 may be reduced.

In addition, management information (signals) flowing via the dedicated transmission line 33 may be acquired in a timely manner, regardless of the communication cycle (first predetermined cycle) of request signals from the general-purpose equipment controller 11, thereby enabling rapid acquisition of management information by the general-purpose equipment controller 11.

Figure 14:
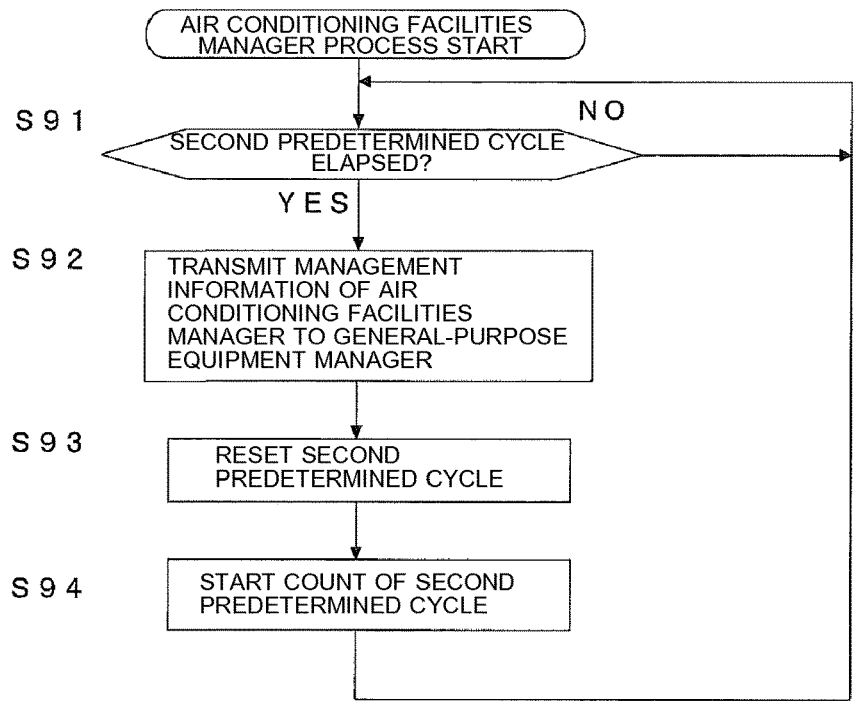
FIG. 14 is a flowchart illustrating exemplary control of a general-purpose equipment controller 11 according to Embodiment 5 of the present invention.

Finally, a processing sequence will be described in which management information (data) is transferred from the air conditioning facilities manager 305 to the general-purpose equipment manager 307 to update the management information in the general-purpose equipment manager 307. FIG. 14 is a flowchart illustrating an example of control by the general-purpose equipment controller 11 according to Embodiment 5, and illustrates an example in which the updating of management information in the general-purpose equipment manager 307 by the air conditioning facilities manager 305 is executed in intervals of the second predetermined cycle.

In step S91, the air conditioning facilities manager 305 of the general-purpose equipment controller 11 determines whether or not the second predetermined cycle has elapsed. If the second predetermined cycle has elapsed, the air conditioning facilities manager 305 proceeds to step S92. On the other hand, if the second predetermined cycle has not elapsed, the air conditioning facilities manager 305 returns to step S91.

In step S92, the air conditioning facilities manager 305 transfers management information (data) in the air conditioning facilities manager 305 to the general-purpose equipment manager 307, and updates the management information in the general-purpose equipment manager 307.

In step S93, the air conditioning facilities controller 313 resets the second predetermined cycle. In step S94, the air conditioning facilities controller 313 starts a count of the second predetermined cycle. Thus, in the general-purpose equipment controller 11, the handover of management information from the air conditioning facilities manager 305 to the general-purpose equipment manager 307 is executed in intervals of the second predetermined cycle.

Note that the respective operations in FIGS. 10 to 14 may be executed sequentially or in parallel. Ordinarily, the respective processes are executed in parallel.

Embodiment 6

Embodiment 6 describes the acquiring (obtaining) and updating of a management address or management information of the respective equipment of the air conditioning facilities 23 and the general-purpose equipment 21 connected via the dedicated transmission line 33 in the energy management gateway 13.

Figure 15:
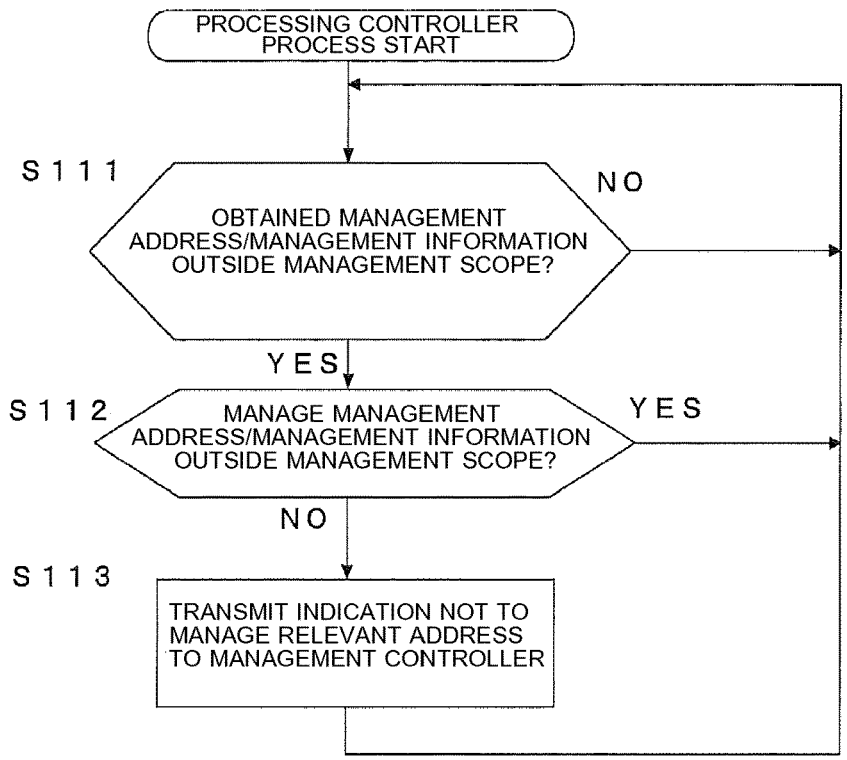
FIG. 15 is a flowchart illustrating exemplary control of an energy management gateway 13 according to Embodiment 6 of the present invention.

FIG. 15 is a flowchart illustrating an example of control by the energy management gateway 13 according to Embodiment 6, and illustrates an example of a process by which the processing controller 355 of the energy management gateway 13 configures what is to be managed. As described in Embodiments 1 to 5, in the storage unit 357 of the energy management gateway 13, there is registered management information of respective equipment to be managed or controlled by the energy management gateway 13 from among running or operating information (data) of the air conditioning facilities 23 and the general-purpose equipment 21 or detection information (data) from various sensors and actuators of the air conditioning facilities 23 and the general-purpose equipment 21 received by the dedicated communication unit 353. Herein, a processing sequence will be described in which management information is hierarchically structured by limiting the management information registered by the processing controller 355.

In step S111, the processing controller 355 determines whether or not a received and acquired (obtained) management address and management information are outside the management scope. If the received and acquired management address and management information are outside the management scope, the processing controller 355 proceeds to step S112. On the other hand, if the received and acquired management address and management information are not outside the management scope, the processing controller 355 returns to step S111.

In step S112, the processing controller 355 determines whether or not to manage the management address and management information that are outside the management scope. In the case of managing the management address and management information that are outside the management scope, the processing controller 355 returns to step S111. On the other hand, in the case of not managing the management address and management information that are outside the management scope, the processing controller 355 proceeds to step S113.

In step S113, the processing controller 355 configures a setting in the management controller 359 so as not to manage the relevant address, and returns to step S111. For example, a communication frame is transmitted to the management controller 359 in a predetermined format conforming to the communication protocol of the destination, in which a management flag is set to 0. Note that although the above describes an example in which a management flag of 0 means outside the management scope while a management flag of 1 means inside the management scope, the configuration is not particularly limited.

Thus, as described above, the processing controller 355, or in other words an application, decides whether or not to manage received management information. Since the management information may be limited by this operation, the level of support for management information expected to be used may be hierarchically structured. For example, suppose that a first application is created to manage all management information, while a second application is created to manage a subset of the management information. In this case, the first application may configure management information that is outside the management scope as information to be managed, whereas the second application may configure only relevant management information as information to be managed. In addition, since management information is directly configured as outside the management scope with respect to the management controller 359, the management controller 359 is able to limit the data that flows to the processing controller 355. In addition, since the management controller 359 imposes a limit on the data that flows to the processing controller 355, the processing controller 355 is also able to limit the data that flows to the general-purpose transmission line 35 via the general-purpose communication unit 351.

Figure 16:
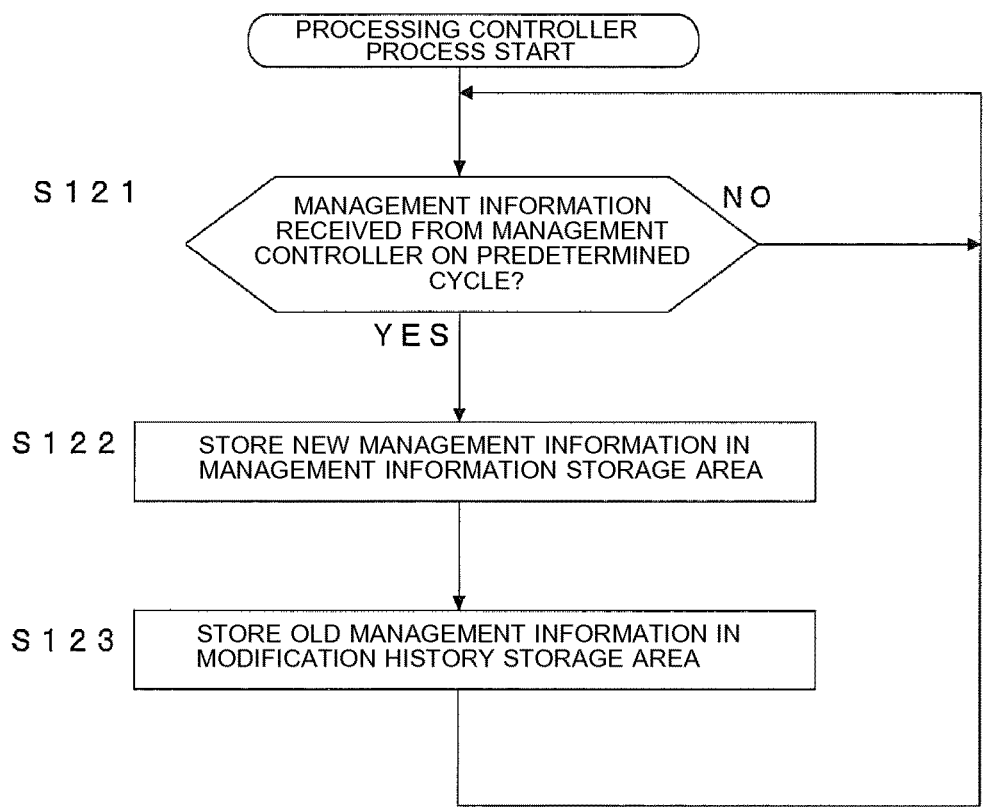
FIG. 16 is a flowchart illustrating exemplary control of an energy management gateway 13 according to Embodiment 6 of the present invention.

FIG. 16 is a flowchart illustrating an example of control by the energy management gateway 13 according to Embodiment 6, and illustrates an example of a process by which the processing controller 355 of the energy management gateway 13 receives management information of the air conditioning facilities 23 and the general-purpose equipment 21 via the dedicated communication unit 353. In addition, the energy management gateway 13 receives management information of the general-purpose equipment 21 via the general-purpose equipment controller 11.

In step S121, the processing controller 355 determines whether or not management information has been received on a predetermined cycle. If management information has been received on a predetermined cycle, the processing controller 355 proceeds to step S122. On the other hand, if management information has not been received on a predetermined cycle, the processing controller 355 returns to step S121.

In step S122, the processing controller 355 stores the new management information in the management information storage area 371.

In step S123, the processing controller 355 stores the old management information in the modification history storage area 373, and returns to step S121.

Thus, as described above, the processing controller 355 stores the new management information and the old management information separately, and is thus able to distinguishably extract the new management information and the old management information. Consequently, the processing controller 355 is able to control the air conditioning facilities 23 and the like with the new management information when conducting ordinary control. Also, the storage unit 357 is able to accumulate the old management information as a history of received management information.

The above describes storing the new management information and the old management information when management information is received on a predetermined cycle. The following will describe storing the new management information and the old management information when requesting the management information of the air conditioning facilities 23 and the general-purpose equipment 21 on a new management information check cycle of the energy management gateway 13.

Figure 17:
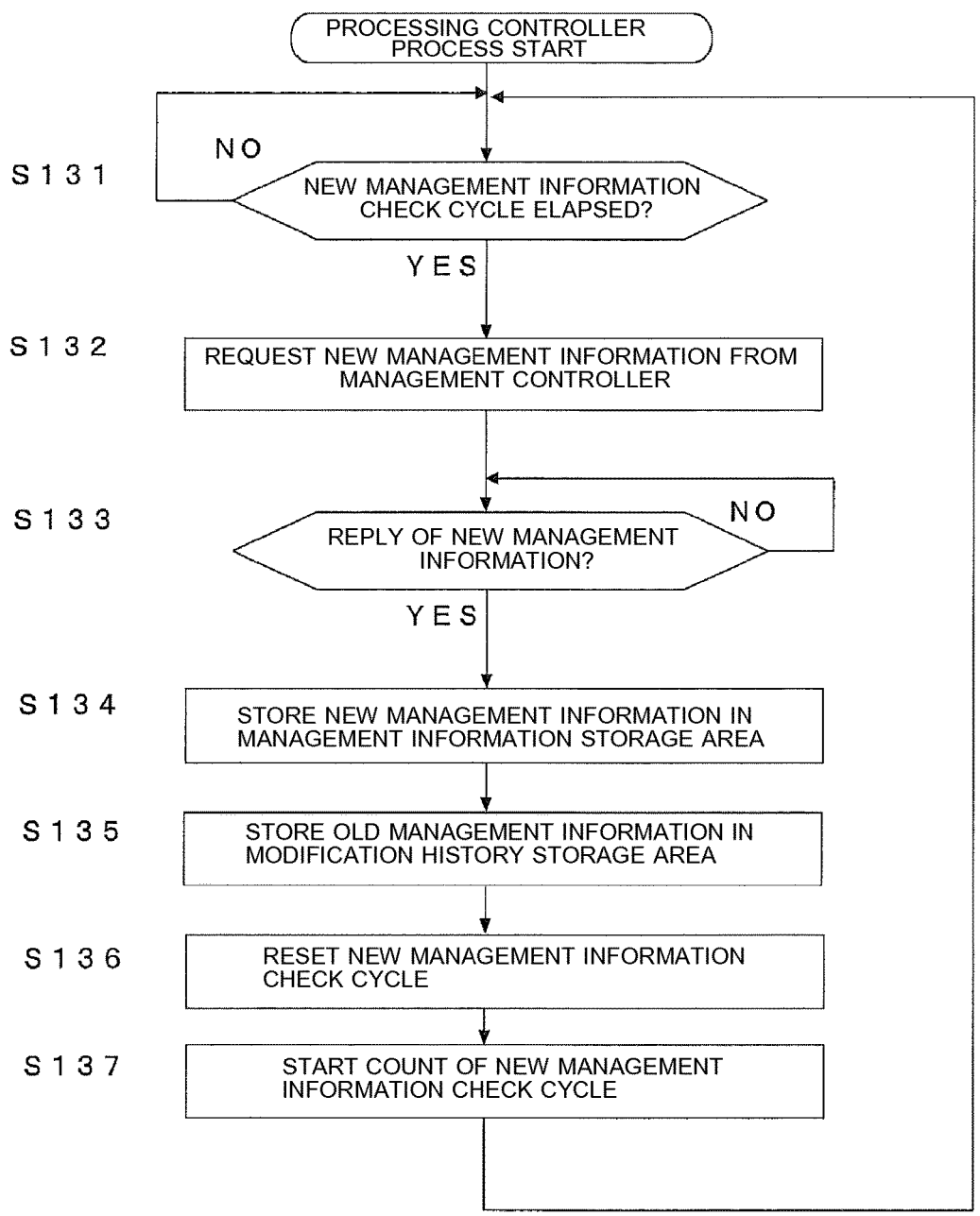
FIG. 17 is a flowchart illustrating exemplary control of an energy management gateway 13 according to Embodiment 6 of the present invention.

FIG. 17 is a flowchart illustrating an example of control by the energy management gateway 13 according to Embodiment 6, and illustrates an example in which the processing controller 355 of the energy management gateway 13 executes a request process for management information of the air conditioning facilities 23 and the general-purpose equipment 21 via the dedicated communication unit 353.

In step S131, the processing controller 355 determines whether or not a new management information check cycle has elapsed. If the new management information check cycle has elapsed, the processing controller 355 proceeds to step S132. On the other hand, if the new management information check cycle has not elapsed, the processing controller 355 returns to step S131.

In step S132, the processing controller 355 requests new management information from the management controller 359.

In step S133, the processing controller 355 determines whether or not there is a reply of new management information. If there is a reply of new management information, the processing controller 355 proceeds to step S134. On the other hand, if there is not a reply of new management information, the processing controller 355 returns to step S133.

In step S134, the processing controller 355 stores the new management information in the management information storage area 371. In step S135, the processing controller 355 stores the old management information in the modification history storage area 373. In step S136, the processing controller 355 resets the new management information check cycle. In step S137, the processing controller 355 starts a count of the new management information check cycle, and returns to step S131.

Thus, as described above, the processing controller 355 requests and acquires new management information from the management controller 359 on a new management information check cycle, and is thus able to conduct various processes on the basis of new management information. Additionally, the processing controller 355 stores the new management information and the old management information separately, and is thus able to distinguishably extract the new management information and the old management information.

Figure 18:
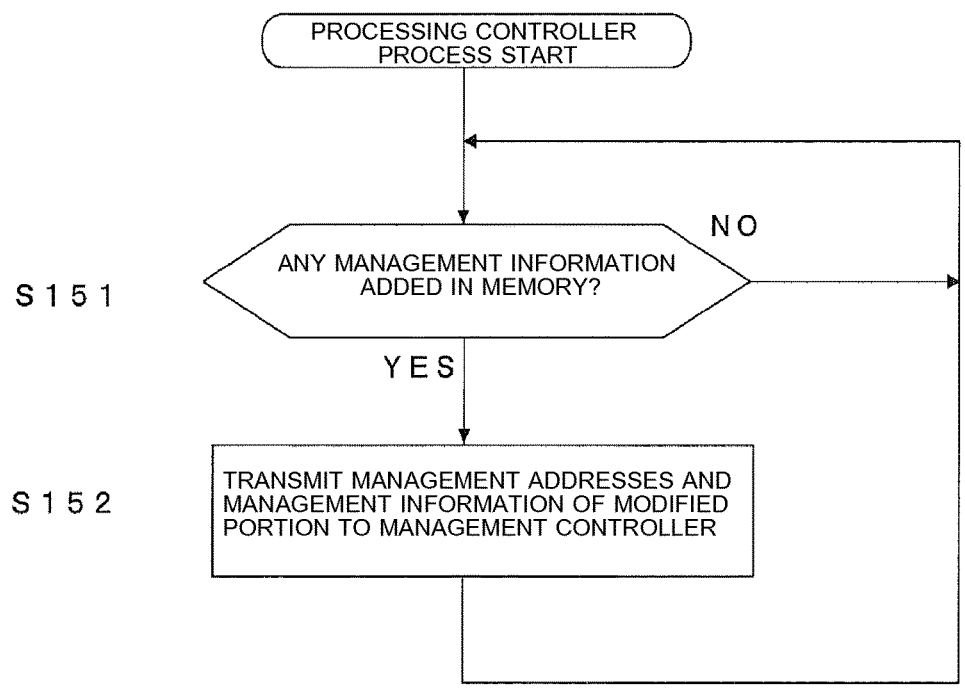
FIG. 18 is a flowchart illustrating exemplary control of an energy management gateway 13 according to Embodiment 6 of the present invention.

Next, a processing sequence of storing a history of modifications made to the management information from the processing controller 355 side in the memory of the processing controller (application) 355 will be described. FIG. 18 is a flowchart illustrating an example of control by the energy management gateway 13 according to Embodiment 6, and illustrates an example of the processing controller 355 of the energy management gateway 13 executing a management information modification request.

In step S151, the processing controller 355 determines whether or not there is any management information added in memory (not illustrated) inside the processing controller 355. If there is any management information added in the memory, the processing controller 355 proceeds to step S152. On the other hand, if there is no added management information in the memory, the processing controller 355 returns to step S151.

In step S152, the processing controller 355 transmits the management addresses and management information of the modified portion stored in memory to the management controller 359, and returns to step S151.

Thus, as described above, when a modification is made to the management information from the processing controller 355 side, the processing controller 355, or in other words the application, transfers the modified management addresses and management information to the management controller 359.

Figure 19:
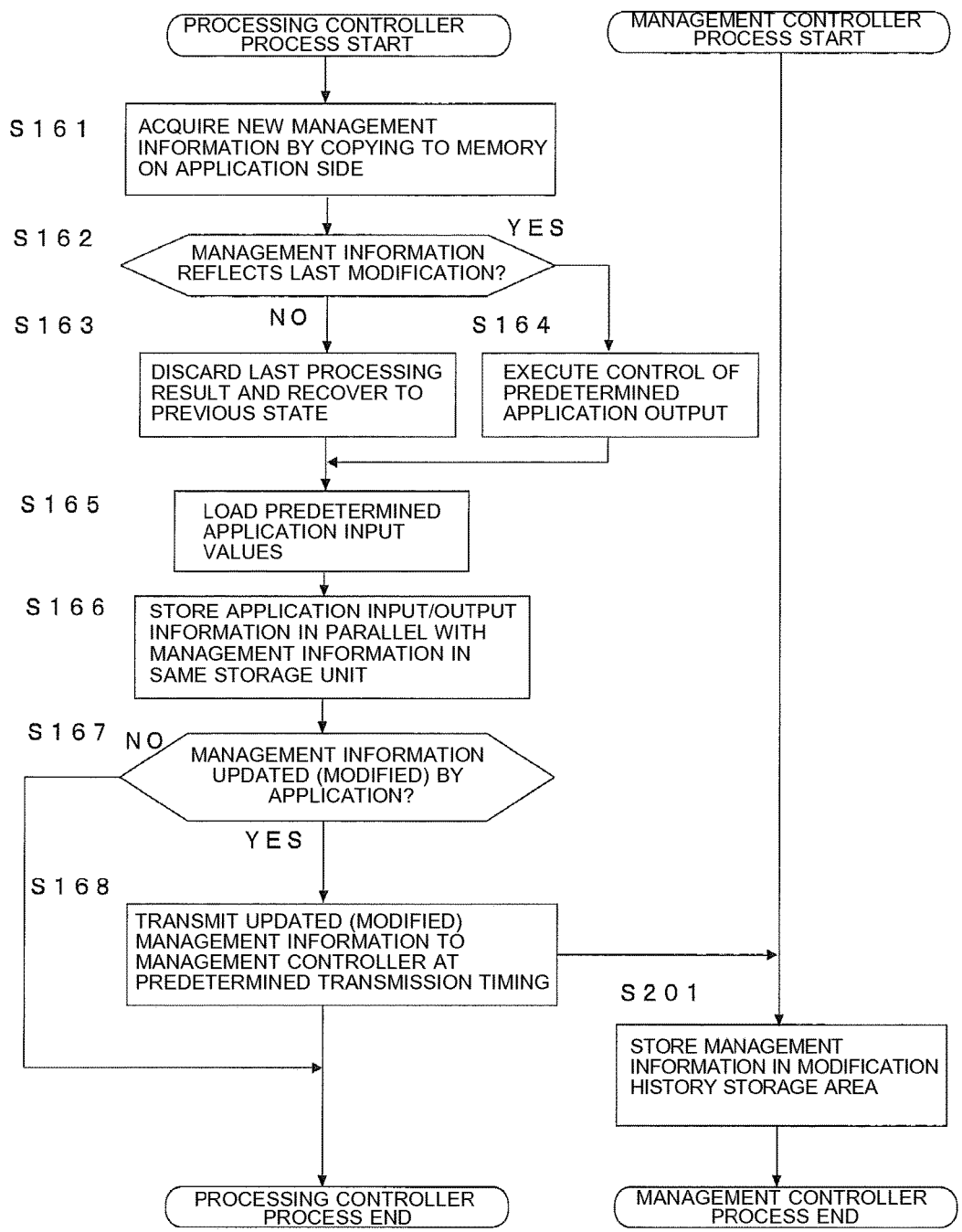
FIG. 19 is a flowchart illustrating exemplary control of an energy management gateway 13 according to Embodiment 6 of the present invention.

FIG. 19 is a flowchart illustrating an example of control by the energy management gateway 13 according to Embodiment 6, and illustrates an example of a process used as an ordinary application by the processing controller 355 of the energy management gateway 13.

In step S161, the processing controller 355 copies and acquires the new management information being stored in the management information storage area 371 to the memory on the application side.

In step S162, the processing controller 355 compares the new management information stored in the management information storage area 371 to the old management information stored in the modification history storage area 373, and thereby determines whether or not the management information reflects the last modification. If the management information reflects the last modification, the processing controller 355 proceeds to step S163. On the other hand, if the management information does not reflect the last modification, the processing controller 355 proceeds to step S164.

In step S163, the processing controller 355 discards the last processing result and recovers to the previous state. For example, the processing controller 355 references the last processing result from a processing result storage area (not illustrated) allocated in the memory on the application side, and recovers the referenced last processing result to the previous state.

In step S164, the processing controller 355 executes control of predetermined application output. In step S165, the processing controller 355 loads predetermined application input values. In step S166, the processing controller 355 stores application input/output information in the same storage unit 357 as the management information, such as storing in parallel in the management information storage area 371.

For example, by creating a structure in which application input/output information and management information may be mutually referenced at the same time, the processing controller 355 is able to reference processing results with respect to the same time axis. As another example, suppose that a storage area storing the application input/output information and a storage area storing the management information are structured to be physically parallel, so that the processing controller 355 is able to simultaneously store a plurality of data at the same timing. Likewise in this case, it is possible to reference processing results with respect to the same time axis. As another example, suppose that the processing controller 355 configures a storage area storing the application input/output information in a first in, first out (FIFO) data structure, and configures a storage area storing the management information in a FIFO data structure. Likewise in this case, it is possible to reference processing results with respect to the same time axis. Note that although the above description illustrates an example of storing both the application input/output information and the management information in parallel in the management information storage area 371, the configuration is not particularly limited. For example, an identifier indicating that information was processed at the same time may be assigned to each of the application input/output information and the management information.

In step S167, the processing controller 355 determines whether or not the application has updated (modified) the management information. If the application has updated (modified) the management information, the processing controller 355 stores update (modification) information in memory, and proceeds to step S168. On the other hand, if the application has not updated (modified) the management information, the processing controller 355 ends the process. In step S168, the processing controller 355 transmits the updated (modified) information to the management controller 359 at a predetermined timing, and ends the process. In step S201, the management controller 359 stores the management information in the modification history storage area 373, and ends the process.

Thus, as described above, since the content modified in the application is transmitted from the processing controller 355 to the management controller 359, the processing controller is able to transmit modified management information to the air conditioning facilities 23 and the general-purpose equipment controller 11 over the dedicated transmission line 33 via the dedicated communication unit 353. Also, since the application is executed on the basis of the new management information, it is possible to conduct processing that reflects the new management information. In addition, since the application input/output information and the management information is stored in parallel, processing details executed on the same time axis may be referenced easily.

Note that the respective operations in FIGS. 15 to 19 may be executed sequentially or in parallel. Ordinarily, the respective processes are executed in parallel.

Note that in the description of the foregoing Embodiments 1 to 6, an example is described in which the general-purpose equipment controller 11 and the energy management gateway 13 perform respectively separate computations and carry processes in separate housings, or in other words, in physically separated locations. However, the configuration is not particularly limited thereto. For example, the function of the general-purpose equipment controller 11 and the function of the energy management gateway 13 may also be installed in a single server in logically different modes. In other words, it is sufficient to execute the function of the general-purpose equipment controller 11 and the function of the energy management gateway 13, respectively, and the physical storage location or execution location is not particularly limited. For example, the respective operations of FIGS. 10 to 19 may be distributed among a plurality of servers or the like in remote locations, and processing may be executed while mutually synchronizing the computational results. In addition, as described above, by virtualizing the function of the general-purpose equipment controller 11 and the function of the energy management gateway 13 in logically different modes, the two functions may be implemented in a single server.

As above, there is configured an air-conditioning system 1 provided with: air conditioning facilities 23 including one or a plurality of indoor units 53 and one or a plurality of outdoor units 51; a dedicated transmission line 33 that is a network corresponding to a communication protocol dedicated to the air conditioning facilities 23; a general-purpose equipment controller 11, connected to the air conditioning facilities 23 via the dedicated transmission line 33, to which one or a plurality of general-purpose equipment 21 is connected; and an energy management gateway 13, connected to the air conditioning facilities 23 and the general-purpose equipment controller 11 via the dedicated transmission line 33, that manages the air conditioning facilities 23. The energy management gateway 13 includes a dedicated communication unit 303 that enables communication with the air conditioning facilities 23 via the dedicated transmission line 33, a management controller 359 that collects management information preregistered for managing the air conditioning facilities 23 from among various information received via the dedicated communication unit 303, and a processing controller 355 that executes computational processing related to management of the air conditioning facilities 23 on the basis of the collected management information, and controls the air conditioning facilities 23. The general-purpose equipment controller 11 receives or accepts input of running information corresponding to each of the air conditioning facilities 23 and the general-purpose equipment 21, and controls the general-purpose equipment 21 on the basis of the running information.

With this configuration, the energy management gateway 13 is configured to receive a signal sent to another device along the dedicated transmission line 33, and conduct an acquisition process if the received signal include data to be acquired. For this reason, since desired data may be acquired without requesting each piece of equipment to transmit signals related to respective data, and since it is not necessary to send out, on the dedicated transmission line, signals including the same data for every request, an increase in the communication traffic of the overall system may be prevented.

REFERENCE SIGNS LIST 1 air-conditioning system 11 general-purpose equipment controller 13 energy management gateway 21 general-purpose equipment 23 air conditioning facilities 25 external device 31 input/output signal line 33 dedicated transmission line 35 general-purpose transmission line 41 refrigerant pipes 51 outdoor unit 53 indoor unit 61 outdoor unit temperature sensor 63 indoor unit humidity sensor 65 indoor unit temperature sensor 71 air conditioning remote control 73 display unit 75 operating unit 81 illumination sensor 83 presence sensor 85, 107 temperature/humidity sensor 91 energy management device 93 web browser 95 wireless transmission equipment 97 tablet computer 101 humidifier 103 heater 105 ventilation fan 111 compressor 113 four-way switching valve 115 outdoor unit side heat exchanger 117 outdoor unit side expansion valve 119 accumulator 121 outdoor unit side fan 131 outdoor unit controller 133 outdoor unit communicating unit 215 indoor unit side heat exchanger 217 indoor unit side expansion valve 221 indoor unit side fan 231 indoor unit controller 233 indoor unit communicating unit 301 power receiver 303 dedicated communication unit 304 equipment controller 305 air conditioning facilities manager 307 general-purpose equipment manager 311 air conditioning facilities configuration unit 313 air conditioning facilities controller 321 general-purpose equipment configuration unit 323 general-purpose equipment control section 325 general-purpose equipment input/output unit 331 general-purpose equipment input unit 333 general-purpose equipment output unit 351 general-purpose communication unit 353 dedicated communication unit 355 processing controller 357 storage unit 359 management controller 371 management information storage area 373 modification history storage area 375 modification content regulation area 381 management information collector 383 management information modifier 385 modification content regulator

The invention claimed is:

1. An air-conditioning system comprising:
air conditioning facilities including one or a plurality of indoor units and one or a plurality of outdoor units;
a dedicated transmission line that is a network corresponding to a communication protocol dedicated to the air conditioning facilities;
a general-purpose equipment controller to which one or a plurality of general-purpose equipment is connected via an input/output signal line, the general-purpose equipment controller being connected to the air conditioning facilities via the dedicated transmission line; and
an energy management gateway, connected to the air conditioning facilities and the general-purpose equipment controller via the dedicated transmission line, and managing the air conditioning facilities, wherein
the energy management gateway includes
a dedicated communication unit that enables communication with the air conditioning facilities via the dedicated transmission line,
a management controller that collects management information preregistered for managing the air conditioning facilities from among various information received via the dedicated communication unit,
a processing controller that controls the air conditioning facilities on the basis of the collected management information, and
a general-purpose communication unit that enables communication with external equipment via a general-purpose transmission line by an open protocol having a communication protocol that is publicly disclosed, and
the general-purpose equipment controller
receives or accepts input of running information corresponding to each of the air conditioning facilities and the general-purpose equipment, controls the air conditioning facilities via the dedicated transmission line on the basis of the running information, and controls the general-purpose equipment via the input/output signal line excluding the dedicated transmission line on the basis of the running information.

2. The air-conditioning system of claim 1, wherein
the general-purpose equipment controller controls the general-purpose equipment on the additional basis of a control instruction from the energy management gateway.

3. The air-conditioning system of claim 1, wherein
the various information received by the dedicated communication unit at least includes the running information about the air conditioning facilities, detection information from sensors in the air conditioning facilities, and the running information about the general-purpose equipment.

4. The air-conditioning system of claim 1, wherein
the various information received by the dedicated communication unit includes a management address identifying a piece of equipment in the air conditioning facilities or the general-purpose equipment, and a communication command indicating data content, and
the management controller collects the management information on the basis of the management address and the communication command indicating data content.

5. The air-conditioning system of claim 4, wherein
the management address is a source or destination address.

6. The air-conditioning system of claim 4, wherein
the dedicated communication unit receives the management address and the communication command flowing via the dedicated transmission line.

7. The air-conditioning system of claim 4, wherein
the management address and the communication command received by the dedicated communication unit is a control command among the air conditioning facilities.

8. The air-conditioning system of claim 1, wherein
the management controller collects management information preregistered for managing the general-purpose equipment, and
when the energy management gateway does not acquire the management information flowing on the dedicated transmission line from the air conditioning facilities in a predetermined period, the energy management gateway issues a transmission request for the management information that is scheduled to be acquired.

9. The air-conditioning system of claim 1, wherein
the management information is registered for each management address that identifies a piece of equipment in the air conditioning facilities or the general-purpose equipment.

10. The air-conditioning system of claim 1, wherein
the communication protocol dedicated to the air-conditioning facilities is a protocol that is not publicly disclosed outside of a manufacturer of the air conditioning facilities.

11. The air-conditioning system of claim 1, wherein
the general-purpose equipment includes at least one from among a ventilation device, a humidifier, and a heater that conducts air-conditioning control linked to the air conditioning facilities connected to the dedicated transmission line.

12. The air-conditioning system of claim 1, wherein
the energy management gateway includes a management information modifier that modifies the management information, and a modification content regulator that regulates modifications to the management information, and
the modification content regulator determines whether or not information for which there is a request to modify the management information is information for which modification of the management information is regulated by the modification content regulator, and in the case of management information whose modification is not regulated, modifies content of the management information.

13. The air-conditioning system of claim 1, wherein
the air conditioning facilities includes one or a plurality of air conditioning remote controls, and
the air conditioning remote control receives detection and operating information about the general-purpose equipment via the general-purpose equipment controller, and additionally accepts operating input for control of the general-purpose equipment.

14. The air-conditioning system of claim 1, wherein
the processing controller is formed as an updateable program module.

15. The air-conditioning system of claim 1, wherein
the general-purpose communication unit and the dedicated communication unit perform protocol conversion for reception and transmission of information from the air-conditioning system to the external device.

16. The air-conditioning system of claim 1, wherein
the running information indicates a running status of each piece of the air conditioning facilities and the general-purpose equipment.

17. The air-conditioning system of claim 1, wherein
the dedicated communication unit
has an interface that communicates according to the dedicated protocol with the general-purpose equipment controller and the management controller,
receives a signal on the dedicated transmission line and extracts data from the signal on the dedicated transmission line,
performs protocol conversion on the communication signal corresponding to the dedicated protocol and which is communicated via the dedicated transmission line, and
sends, on the dedicated transmission line, a control command sent from the management controller, and
the general-purpose equipment controller
has an interface the communicates with the general-purpose equipment and the energy management gateway,
performs format conversion to convert a control signal and a detection signal from the general-purpose equipment into a communication signal or data, respectively, corresponding to the dedicated protocol, and
transmits the converted communication signal or data to the energy management gateway via the dedicated transmission line.

18. The air-conditioning system of claim 1, wherein
the energy management gateway includes a management information storage area that stores, according to a unique management address that identifies each piece of equipment among the air conditioning facilities and the general-purpose equipment, the preregistered management information by which the energy management gateway manages the air conditioning facilities and the general-purpose equipment, and
the management controller includes a management information collector which acquires preregistered management information received by the dedicated communication unit.

19. An air-conditioning system comprising:
air conditioning facilities including one or a plurality of indoor units and one or a plurality of outdoor units;
a dedicated transmission line that is a network corresponding to a communication protocol dedicated to the air conditioning facilities;
a general-purpose equipment controller to which one or a plurality of general-purpose equipment is connected via an input/output signal line, the general-purpose equipment controller being connected to the air conditioning facilities via the dedicated transmission line; and
an energy management gateway, connected to the air conditioning facilities and the general-purpose equipment controller via the dedicated transmission line, and managing the air conditioning facilities, wherein
the energy management gateway includes
a dedicated communication unit that enables communication with the air conditioning facilities via the dedicated transmission line,
a management controller that collects management information preregistered for managing the air conditioning facilities and the general-purpose equipment from among various information received via the dedicated communication unit,
a processing controller that controls the air conditioning facilities and the general-purpose equipment on the basis of the collected management information, and
a general-purpose communication unit that enables communication with external equipment via a general-purpose transmission line by an open protocol having a communication protocol that is publicly disclosed, and
the general-purpose equipment controller
receives or accepts input of running information corresponding to each of the air conditioning facilities and the general-purpose equipment, controls the air conditioning facilities via the dedicated transmission line on the basis of the running information, and controls the general-purpose equipment via the input/output signal line excluding the dedicated transmission line, on the basis of the running information.

20. The air-conditioning system of claim 19, wherein the processing controller performs control by linking the general-purpose equipment to the air conditioning facilities via the general-purpose equipment controller.

* * * * *